United States Patent
Sato

(10) Patent No.: US 7,268,907 B2
(45) Date of Patent: Sep. 11, 2007

(54) IMAGE FORMING APPARATUS, IMAGE FORMING SYSTEM, IMAGE FORMING METHOD, AND CONTROL PROGRAM FOR PRINTING DATA REQUESTED FROM A CLIENT APPARATUS VIA A NETWORK

(75) Inventor: Eiichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 10/307,993

(22) Filed: Dec. 3, 2002

(65) Prior Publication Data

US 2003/0123083 A1    Jul. 3, 2003

(30) Foreign Application Priority Data

Dec. 3, 2001  (JP) ............................. 2001-369137
Nov. 26, 2002  (JP) ............................. 2002-342853

(51) Int. Cl.
  *G06F 3/12*   (2006.01)
  *G06K 1/00*   (2006.01)
(52) U.S. Cl. .................. 358/1.15; 358/402; 379/100.08
(58) Field of Classification Search ............... 358/1.15, 358/2.1, 402; 709/203, 206; 379/100.08; 715/517; 348/402
See application file for complete search history.

(56) References Cited

U.S. PATENT DOCUMENTS 6,982,801 B1 *  1/2006 Saito ........................ 358/1.15
2001/0033390 A1 * 10/2001 Tonegawa .................. 358/1.15
2002/0051183 A1 *  5/2002 Tsukui et al. .............. 358/1.15
2002/0097414 A1 *  7/2002 Utsunomiya ............... 358/1.13
2002/0154328 A1 * 10/2002 Sato ........................ 358/1.13
2003/0063309 A1 *  4/2003 Parry ....................... 358/1.15
2003/0135571 A1 *  7/2003 Sato ........................ 709/206

FOREIGN PATENT DOCUMENTS

JP    2000-358114    12/2000

OTHER PUBLICATIONS

PCL/PJL Reference Set: PCL 5 Printer Language Technical Quick Reference Guide, 1999, Published by Hewlett Packard, pp. 1-2.*

* cited by examiner

*Primary Examiner*—Aung S. Moe
*Assistant Examiner*—Dillon Murphy
(74) *Attorney, Agent, or Firm*—Fitzpatrick, Cella, Harper & Scinto

(57) ABSTRACT

Together with an image forming apparatus, a method and a control program which can be applied to the image forming apparatus are disclosed in an embodiment of the invention. The image forming apparatus is an image forming apparatus for printing data whose printing has been requested from a client apparatus via a network. The image forming apparatus has: identifying means for identifying a text portion and an attached file with respect to E-mail transmitted from the client apparatus, recognizing means for recognizing control data which can be disclosed in the text portion of the E-mail and control data which can be enclosed in the attached file identified by the identifying means, and control means for controlling a printing process in accordance with a recognition result of the recognizing means showing whether at least either the text portion or the attached file identified by the identifying means includes the control data or not.

20 Claims, 18 Drawing Sheets

FIG. 5

| CONTROL ITEM | WIDTH OF VALUE | INITIAL VALUE | |
|---|---|---|---|
| Copies | 0 TO 99 | 1 | ~504 |
| Orientation | Portrait<br>Landscape | Landscape | ~505 |
| Size | 11×17<br>Letter<br>A4<br>etc... | Letter | ~506 |
| Paper Source | Automatically<br>Stack Bypass<br>Drawer 1<br>Drawer 2 | Automatically | ~507 |
| Output Tray | Automatically<br>Sample Tray<br>Stack Tray<br>Booklet Tray | Automatically | ~508 |
| Resolution | 600dpi<br>300dpi | 600dpi | ~509 |
| Zoom | 10% TO 400% | 100% | ~510 |
| Page Layout | 1-up<br>2-up<br>4-up<br>8-up<br>16-up | 1-up | ~511 |
| Watermark | none<br>CONFIDENTIAL<br>COPY<br>DRAFT<br>etc... | none | ~512 |
| 2-Side Printing | Yes or No | No | ~513 |
| Z-fold | Yes or No | No | ~514 |
| Booklet | Yes or No | No | ~515 |
| Staple Position | Disable<br>Top Left<br>Top Right<br>Bottom Left<br>Bottom Right | Disable | ~516 |
| Hole Punch | Disable<br>2 Hole<br>3 Hole | Disable | ~517 |

IMAGE FORMING APPARATUS, IMAGE FORMING SYSTEM, IMAGE FORMING METHOD, AND CONTROL PROGRAM FOR PRINTING DATA REQUESTED FROM A CLIENT APPARATUS VIA A NETWORK

BACKGROUND OF THE INVENTION

1. Field of the Invention

The invention relates to a print control technique for allowing an image forming apparatus such as a printer or the like on a network to execute printing on the basis of an instruction from a client apparatus.

2. Related Background Art

In a conventional multifunction terminal apparatus, in a file in a TIFF-F format, a tag code which is inherently used to express a type (resolution, the number of colors, etc.) of data is expanded and a tag code including print control information is added, thereby realizing print control of image data.

Subsequently, Japanese Patent Application Laid-Open No. 2000-358114 will be simply explained. According to it, there has been proposed a multifunction terminal apparatus characterized by comprising a print control unit for controlling in a manner such that a file comprising a tag code and encoded image data and a tag code including print control information added to the file on a transmitting source side are received via a network, image data for printing is formed by compounding the tag code and the encoded image data, and printing is executed under conditions designated by the tag code including the print control information. In FIG. 18, reference numeral 1801 denotes a file in a TIFF-F format which has conventionally widely been known as a standardized file format for handling image data; 1802 a tag code indicative of a type of data; 1803 image data; and 1804 a tag code additionally formed in order to add print control information. The receiving and printing operations in the above conventional apparatus will be described with reference to FIG. 19. In the multifunction terminal apparatus, when the file 1801 in the TIFF-F format and the tag code 1804 including the print control information described in FIG. 18 are received (step S1901), the file 1801 in the TIFF-F format is analyzed by a TIFF-F analyzing unit (step S1902), and the image data 1803 is compounded by an encoding compounding unit (step S1903). The tag code is analyzed by a print control unit (step S1904), sent as a printer control command to a printer unit, and print processed (step S1905). An example of a similar system has been disclosed in Japanese Patent Application Laid-Open No. 2000-358114.

Although the above system is based on a method using a feature such that an application which handles TIFF data ignores a data tag which cannot be handled by itself, it cannot be applied to an image data format such as JPEG, BMP, or the like in which such a tag code cannot be included. Those conventional techniques have a problem such that a format of the image data serving as a print target is limited, or the like.

SUMMARY OF THE INVENTION

It is a feature of the invention to provide a mechanism which can flexibly cope with various data formats of attached data.

It is another feature of the invention to make it possible to print a plurality of copies by transmitting data once even in the case of, for example, printing a plurality of copies of image data.

It is still another feature of the invention to provide a mechanism such that in the case of printing data including print control information, printing to which an intention of a creator who forms the data including the print control information is reflected can be executed.

It is further another feature of the invention to provide a mechanism such that even if data attached to E-mail is which one of image data and data including print control information, a print result which is desired by the user can be obtained by executing a printing process in accordance with control data which is supplied by a text portion of the E-mail.

It is further another feature of the invention to provide a mechanism such that when data including print control information made by the third party is also used and printed, a print output can be obtained without remaking the data including print control information.

To accomplish at least one of the foregoing features, according to an embodiment of the invention, in addition to the following image forming apparatus, a method and a control program which can be applied to such an image forming apparatus are disclosed. The image forming apparatus is an image forming apparatus for printing data whose printing is requested from a client apparatus via a network. The image forming apparatus which is disclosed as a preferred example of the embodiment comprises: identifying means for identifying a text portion and an attached file with respect to E-mail transmitted from the client apparatus; recognizing means for recognizing control data which can be described in the text portion of the E-mail and control data which can be enclosed in the attached file identified by the identifying means; and control means for controlling a printing process in accordance with a recognition result of the recognizing means showing whether at least either the text portion or the attached file identified by the identifying means includes the control data or not.

Other features and advantages of the present invention will be apparent from the following description taken in conjunction with the accompanying drawings, in which like reference characters designate the same or similar parts throughout thereof.

BRIEF DESCRIPTION OF THE DRAWINGS

FIG. 5 is a diagram showing a format of control sentences which can be inputted by the operator;

DETAILED DESCRIPTION OF THE PREFERRED EMBODIMENTS

Figure 11:
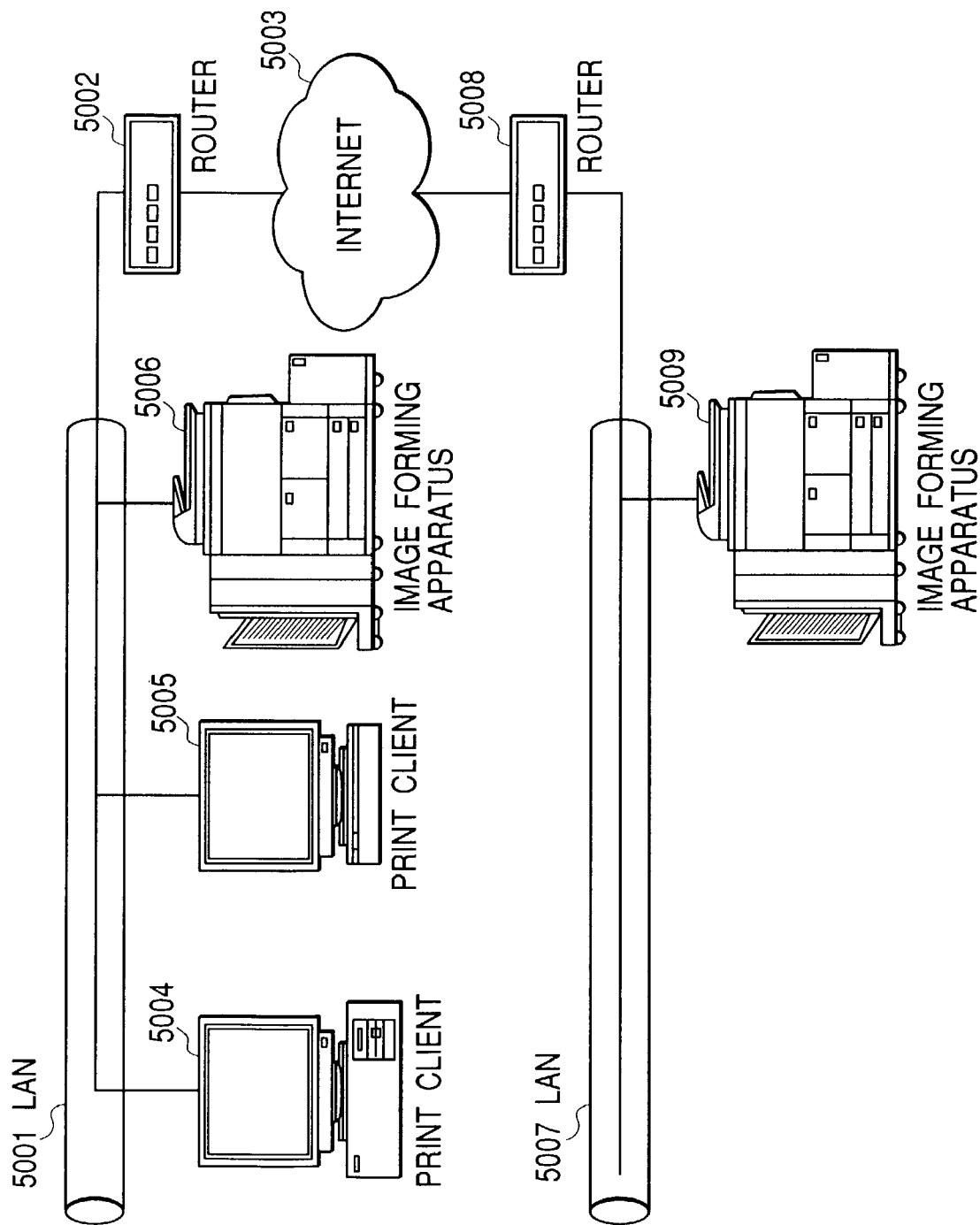
FIG. 11 is a system constructional diagram of an image forming system.

FIG. 11 is a system constructional diagram of an image forming system.

In FIG. 11, reference numeral 5001 denotes a first LAN (Local Area Network); 5002 a first router for connecting LANs of different segments and executing a relay, filtering, or the like of a data packet; 5003 an Internet; 5004 and 5005 print clients serving as computer apparatuses; 5006 a first image forming apparatus connected to the first LAN 5001; 5007 a second LAN separated from the first LAN 5001 by a router; 5008 a second router; and 5009 a second image forming apparatus connected to the second LAN 5007.

Although it is considered that, besides the above apparatuses, a plurality of computer apparatuses which can become print clients, a printer apparatus serving as an image forming apparatus, a server computer apparatus, a relay apparatus such as repeater, HUB, or the like for constructing a network, and the like are connected onto the LANs 5001 and 5007, respectively, they are omitted here.

First System Example

As a first system example, a procedure which is executed until the print client 5004 forms PDL (Page Description Language) print data and it is printed by the first image forming apparatus 5006 by using an existing print protocol will be described.

Figure 12:
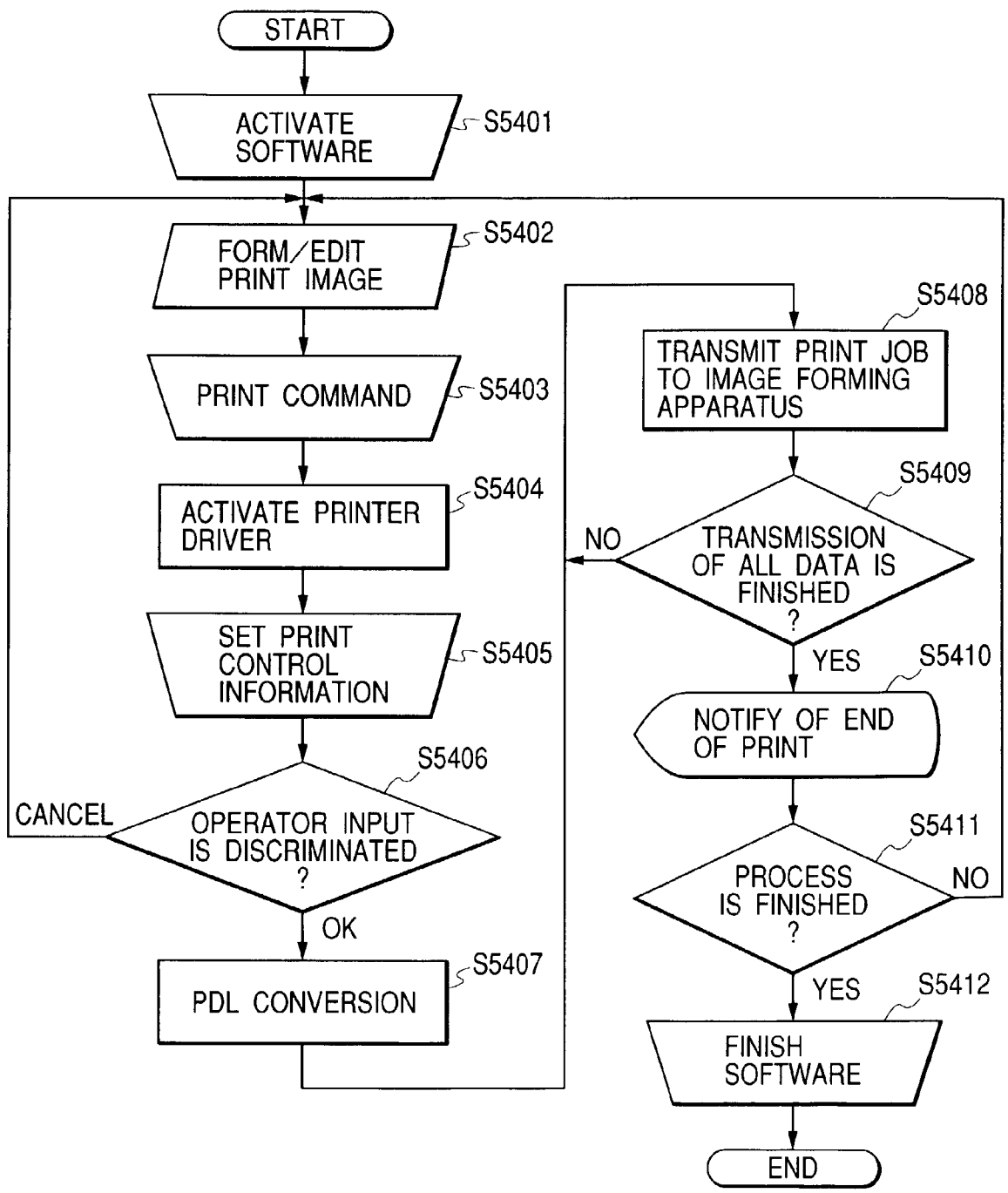
FIG. 12 is a flowchart showing the first example of a printing process of the image forming apparatus.

First, a procedure which is executed until a print job is transmitted from the print client 5004 to the first image forming apparatus 5006 will be described with reference to a flowchart of FIG. 12.

The print client 5004 is a computer apparatus having a function for connecting to the first LAN 5001 by an NIC (Network Interface Card) or the like. At least one software for processing or forming data to be printed has been installed in the print client 5004.

Figure 13:
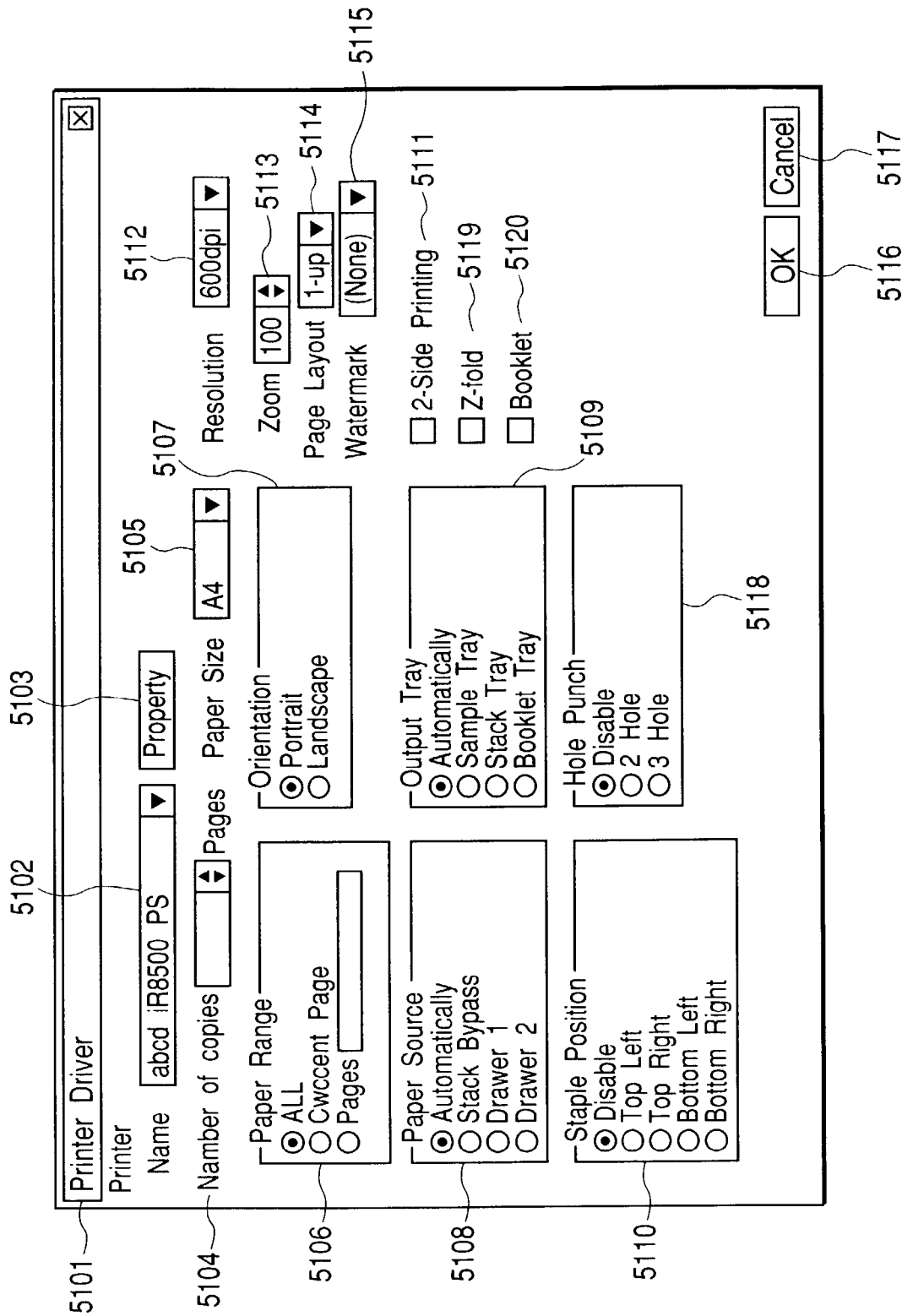
FIG. 13 is a diagram showing an example of a print control picture plane which is displayed by a printer driver.

The operator operates the print client 5004, activates the software in step S5401 and forms and edits the data to be printed in step S5402. When preparation of the data to be printed is completed as mentioned above, the operator instructs the start of printing from the software during the activation in step S5403. When the print command is received, the software activates a printer driver in step S5404 and displays a picture plane for urging the operator to set print control. FIG. 13 shows an example of a print control setting picture plane which is realized by the printer driver.

In FIG. 13, reference numeral 5101 denotes a window picture plane which is provided by the printer driver; 5102 a GUI (Graphic User Interface) to select a printer serving as a print target; 5103 a property button to display detailed information of the selected printer; 5104 a GUI to designate the number of copies; 5105 a GUI to designate a size of paper to be printed; 5106 a GUI to designate a range of a page to be printed; 5107 a GUI to designate an orientation of the paper to be printed; 5108 a GUI to designate a place where the print paper to be printed is fed; 5109 a GUI to designate a place where the printed paper is ejected; and 5110 a GUI to designate a position where the ejected sheets of paper are stapled by a stapler.

Reference numeral 5111 denotes a GUI to designate a 2-side printing (duplex printing) or a 1-side printing (simplex printing); 5112 a GUI to designate resolution upon printing; 5113 a GUI to designate a magnification (zoom) upon printing; 5114 a GUI to designate a page layout; 5115 a GUI to designate a watermark, watermarked characters, or the like; 5116 an OK button to start the printing; 5117 a cancel button to stop the printing; 5118 a GUI to designate a hole punching operation for filing; 5119 a GUI to control so that the print paper is folded in a Z-character shape and ejected; and 5120 a GUI to control the execution of booklet printing.

In step S5405, the operator sets print control information by using the various GUIs shown in FIG. 13 which are provided by the printer driver and, if he has an intention to print, he presses the OK button 5116, thereby urging the software to start the printing. If there is no intention of printing, the operator presses the cancel button 5117, thereby urging the software to finish the operation of the printer driver. The presence or absence of the intention of the operator is discriminated by checking the inputting operation of the operator in step S5406. If it is determined that the cancel button 5117 has been pressed, the software immediately closes the window of the printer driver, returns the processing routine to step S5402, and displays again an edit picture plane of the data to be printed.

If it is determined in step S5406 that the OK button 5116 has been pressed, in step S5407, the software executes a PDL (Page Description Language) conversion for converting the data to be printed into a data format such as a PS (Post Script: registered trademark of Adobe Systems Incorporated) or the like which can be interpreted by the image forming apparatus. The image data to be printed becomes a print job in this manner and, in step S5408, it is transmitted to the first image forming apparatus 5006. At this time, between the print client 5004 and the first image forming apparatus 5006, for example, a TCP/IP (Transmission Control Protocol/Internet Protocol) protocol is used as a communication protocol and an LPD (Line Printer Daemon) protocol is used as a print protocol. Since the LPD protocol has been described in detail in RFC1179, its explanation is omitted here.

The print client 5004 to transmit the print job by using arbitrary communication protocol and print protocol discriminates whether the transmission of all data has been finished or not every minimum transfer block in step S5409. If it is not finished yet, the processing routine is returned to step S5408 and the next transfer block is transmitted. If it is determined in step S5409 that the transmission of all of the data has been finished, in step S5410, a window to notify the operator of the end of the printing is displayed and a GUI to urge the operator to discriminate whether the process is finished or continued is displayed. This discrimination is made in step S5411. If the process is continued, the processing routine is returned to step S5402 and an editing picture plane of the data to be printed is displayed again. In the case of finishing the process, the software is finished in step S5412.

Figure 7:
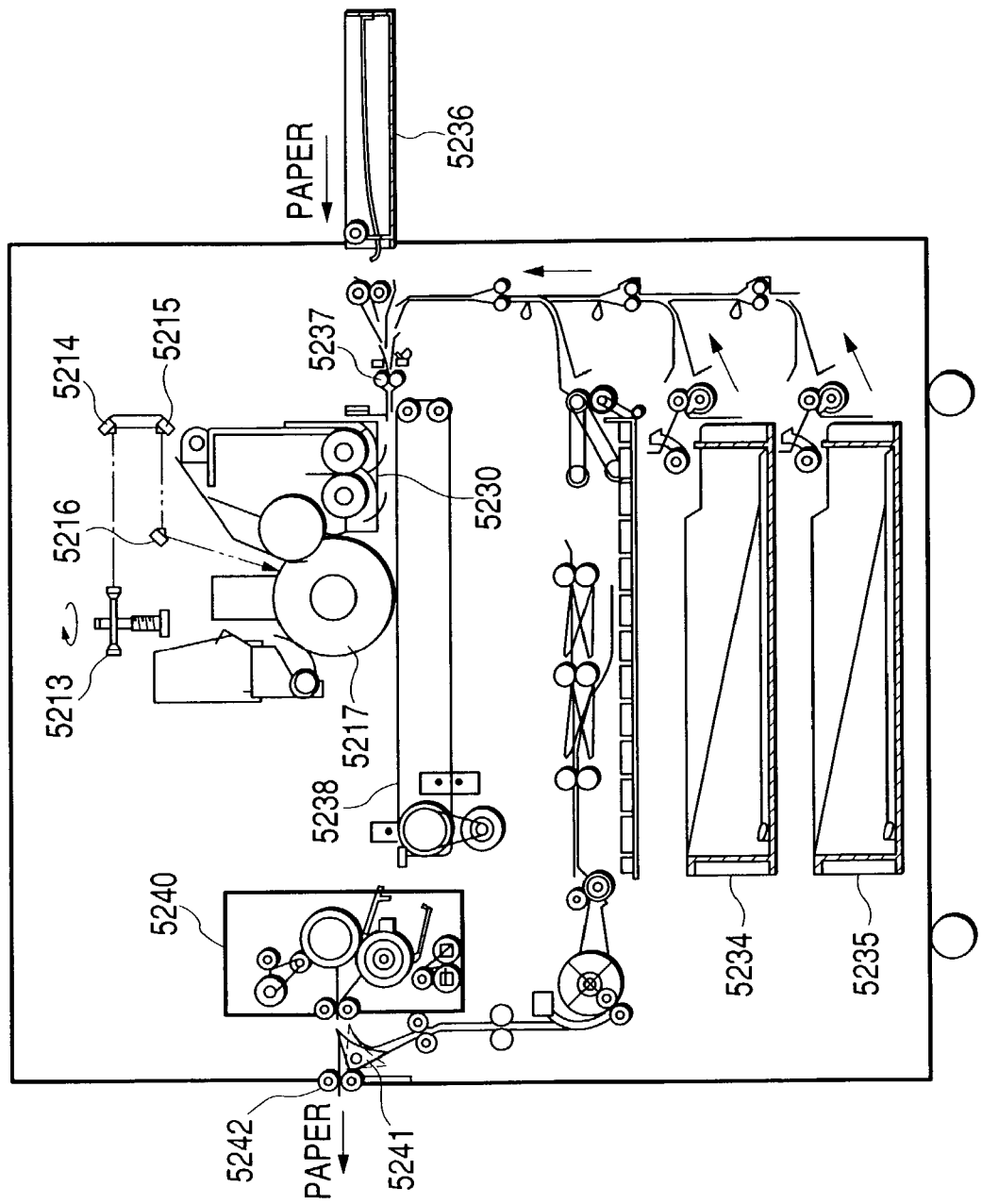
FIG. 7 is a cross sectional view showing a mechanical construction of a monochromatic image forming apparatus.
Figure 8:
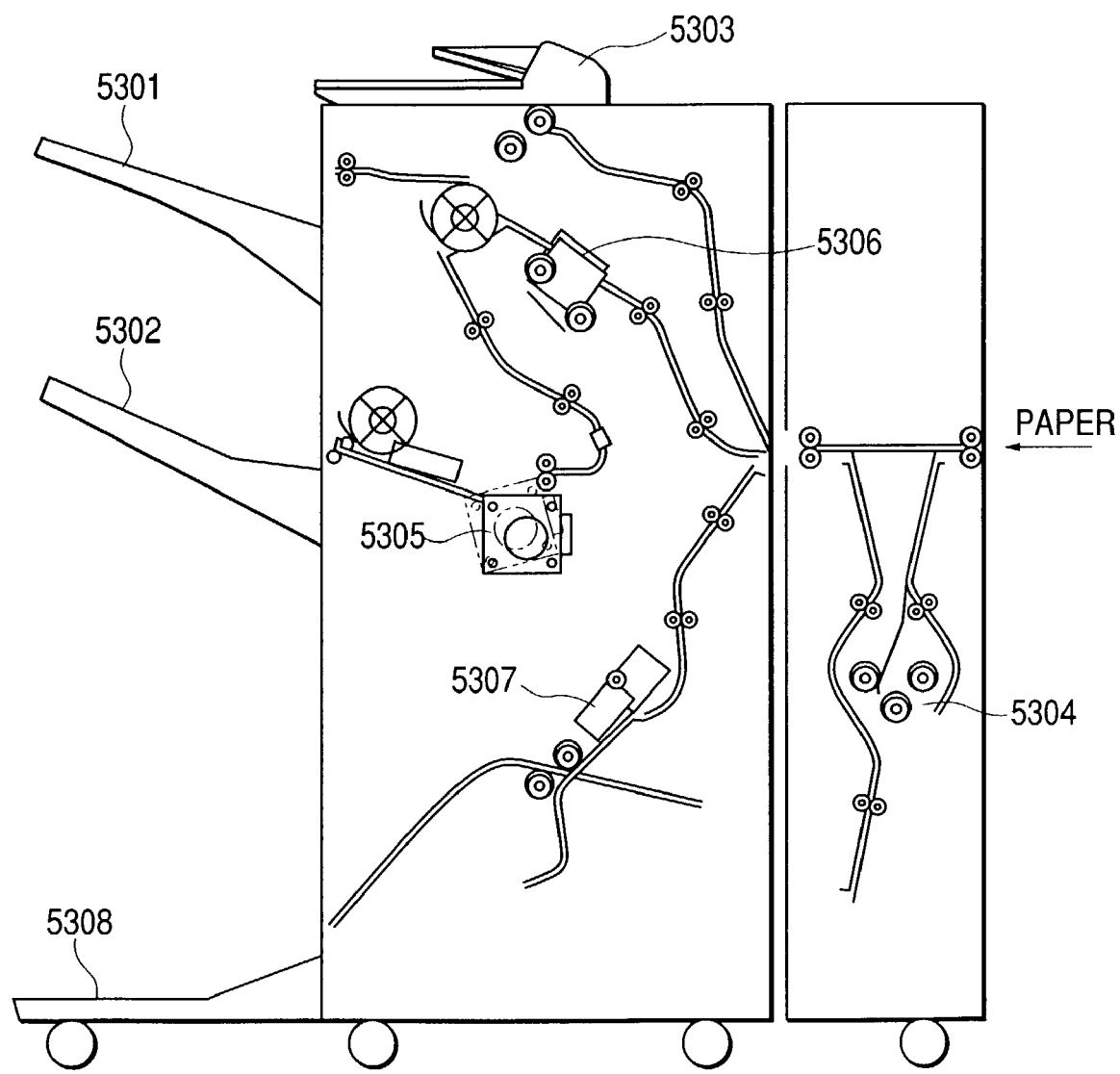
FIG. 8 is a cross sectional view showing a mechanical construction of a paper ejecting apparatus.

Subsequently, a procedure which is executed until the first image forming apparatus 5006 receives the print job transmitted from the print client 5004 and prints an image onto print paper on the basis of the received data will be described hereinbelow with reference to a block diagram of FIG. 2, a flowchart of FIG. 14, a cross sectional view of FIG. 7 showing a mechanical construction of a monochromatic image forming apparatus, and a cross sectional view of FIG. 8 showing a mechanical construction of a paper ejecting apparatus.

Figure 2:
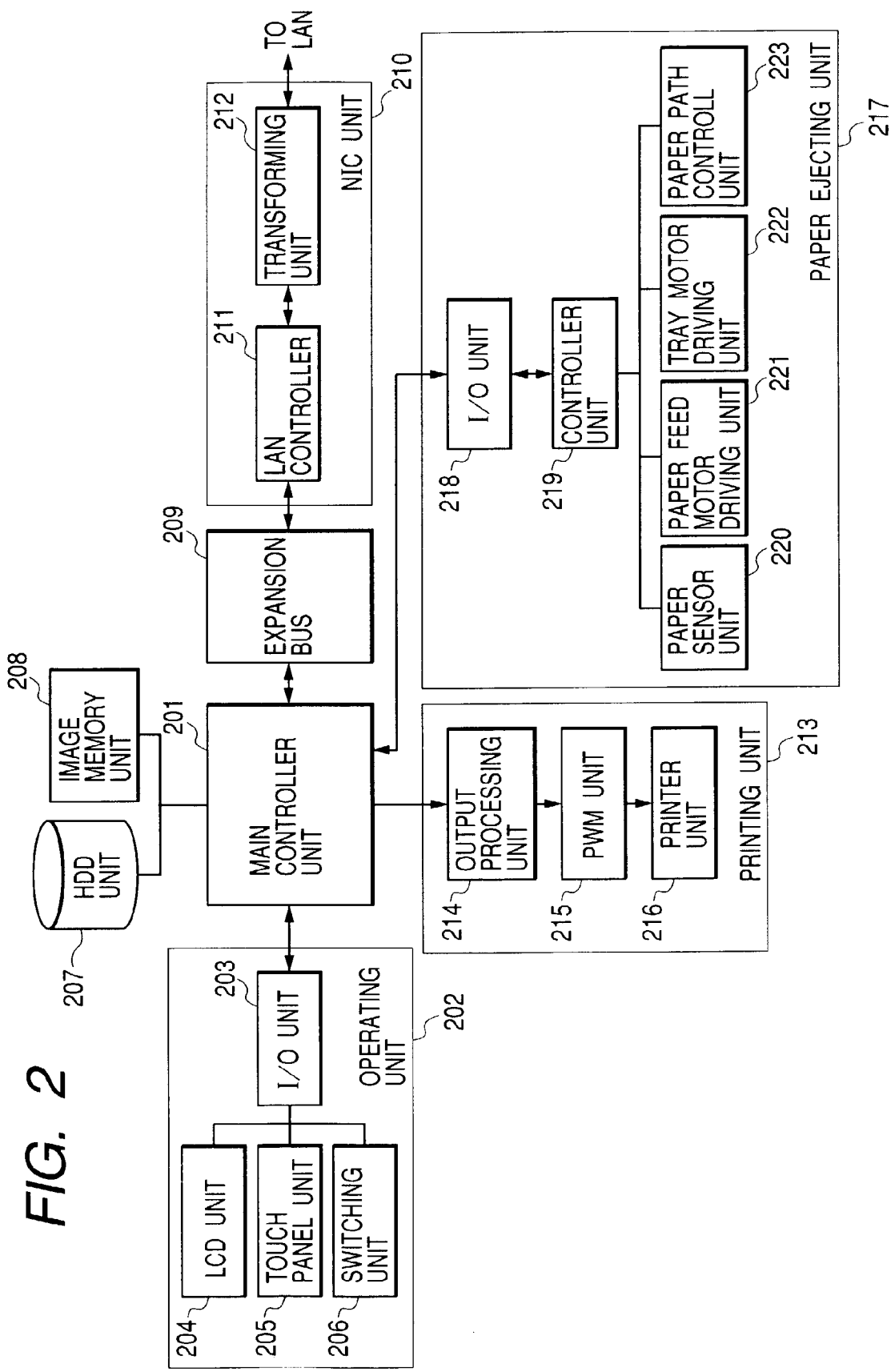
FIG. 2 is a block diagram showing an electrical construction of an image forming apparatus.

FIG. 2 is a block diagram showing an electrical construction of the first image forming apparatus 5006. In FIG. 2, reference numeral 201 denotes a main controller unit to control the whole first image forming apparatus 5006; 202 an operating unit to operate the first image forming apparatus 5006 by the operator; 203 an I/O unit for allowing the operating unit 202 to communicate with the main controller unit 201; 204 an LCD unit to provide information to the operator or display virtual switches; 205 a touch panel unit to detect the operation of the virtual switch displayed on the LCD unit 204; and 206 a switching unit arranged physically so as to allow the operator to execute an operation.

Reference numeral 207 denotes an HDD unit which is used for storing the print data or a program or used as a cache area of the data; 208 an image memory unit which is used for developing or modifying a print image; 209 an expansion bus which is used for expanding functions into the first image forming apparatus 5006; 210 an NIC (Network Interface Card) unit added to the first image forming apparatus 5006 by using the expansion bus 209; and 211 an LAN controller. The LAN controller 211 is used to control in a manner such that a communication packet flowing on the first LAN 5001 is monitored, only information having a relation with the first image forming apparatus 5006 is fetched into the LAN controller 211, or the packet formed by the first image forming apparatus 5006 to the first LAN 5001. Reference numeral 212 denotes a transforming unit for performing a voltage conversion and realizing physical communication between the first image forming apparatus 5006 and the first LAN 5001, and 213 indicates a printing unit for printing an image onto the print paper as a recording media.

Reference numeral 214 denotes an output processing unit for executing processes such as gamma conversion, edge emphasis, smoothing, etc. in order to correct the image data which is sent by the main controller unit to data suitable for printing onto the print paper; 215 a PWM unit for converting the output-processed image data into a signal for driving a laser beam; and 216 a printer unit for printing the image onto the print paper on the basis of the signal supplied by the laser beam.

Reference numeral 217 denotes a paper ejecting unit for ejecting the printed paper formed by the printing unit 213 to an outside of the first image forming apparatus 5006; 218 an I/O unit for allowing the paper ejecting unit 217 to communicate with the main controller unit 201; 219 a controller unit for controlling the paper ejecting unit 217; 220 a paper sensor unit for monitoring the flow of the print paper which passes in the paper ejecting unit 217; 221 a paper feed motor driving unit for driving a motor for feeding the print paper; 222 a tray motor driving unit for driving a paper ejecting tray; and 223 a paper path control unit for controlling the flow of the print paper.

FIG. 7 is a cross sectional view showing a mechanical construction of the first image forming apparatus 5006 which can perform monochromatic image printing.

In FIG. 7, reference numeral 5213 denotes a polygon mirror; 5214, 5215, and 5216 mirrors; 5217 a photosensitive drum for forming a toner image on the basis of a laser beam; 5230 a developing unit for supplying black toner; 5234 and 5235 sheet cassettes for feeding the print paper; 5236 a manual inserting tray for manually feeding the print paper; 5237 a resist roller; 5238 a transfer belt; 5240 a fixing unit; 5241 a flapper for controlling the flow of the print paper; and 5242 an ejecting roller for controlling ejection of the print paper.

FIG. 8 is a cross sectional view of a paper ejecting apparatus showing a mechanical construction of the paper ejecting unit 217. In FIG. 8, reference numeral 5301 denotes a sample tray for ejecting the print paper; 5302 a stack tray for ejecting the print paper; 5303 an inserter for pushing a middle portion of the print paper; 5304 a Z-folding apparatus for folding the print paper; 5305 a stapler for binding the print paper; 5306 a puncher for forming punch holes for filing; 5307 a saddle stitcher for modifying the print paper into a booklet format; and 5308 a booklet tray for ejecting the print paper modified into the booklet format.

Figure 14:
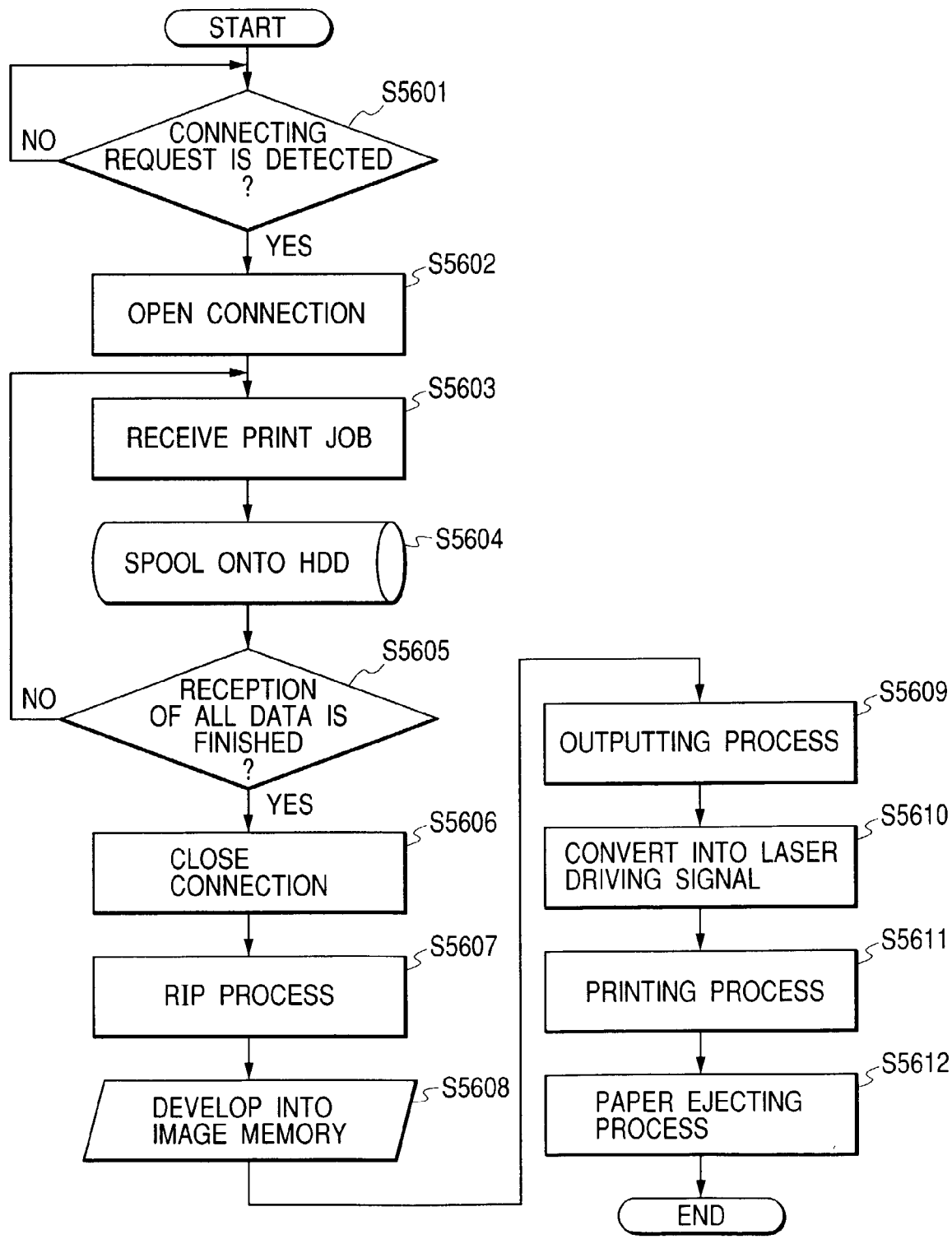
FIG. 14 is a flowchart showing the first example of the printing process of the image forming apparatus.

FIG. 14 is a flowchart showing a procedure which is executed until the first image forming apparatus 5006 receives the print job transmitted from the print client 5004 and prints the image onto the print paper on the basis of the received data.

In the case where the print client 5004 communicates with the first image forming apparatus 5006 via the first LAN 5001, for example, the TCP/IP protocol is used as a communication protocol. In the communication using the TCP/IP protocol, since it is necessary to open a connection between two hosts prior to starting the data communication, the print client 5004 transmits a connecting request (TCP segment in which an SYN bit is ON) to the first image forming apparatus 5006. This connecting request is sent from the NIC unit 210 to the first image forming apparatus 5006 via the first LAN 5001.

In the NIC unit 210, first, the voltage conversion of the reception data is performed by the transforming unit 212 and the resultant data is sent to the LAN controller 211. The LAN controller 211 monitors the connecting request in step S5601. If the connecting request is detected, the connection is opened in step S5602 in accordance with a formal procedure which has been predetermined by the TCP/IP protocol. When the connection is established between two points of the print client 5004 and the first image forming apparatus 5006 in this manner, the print client 5004 transmits the print job to the first image forming apparatus 5006 by using, for example, the LPD protocol as one of the print protocols.

The print job using the LPD protocol is supplied from the print client 5004 to the first image forming apparatus 5006 by using a port of No. 515 of the TCP/IP protocol. In the first image forming apparatus 5006, the print job which is sent by the LPD protocol is transmitted to the main controller unit 201 from the NIC unit 210 via the expansion bus 209.

In the main controller unit 201, if it is determined that the reception data is the print job, while the print job is received in step S5603, the data which is being received is once spooled onto the HDD unit 207 in step S5604, and whether the reception of all data has been finished or not is discriminated in step S5605. At this time, if it is determined that the reception of all of the data is not finished yet, the processing routine is returned to step S5603 and the processes in steps S5603 to S5605 are repeated. However, if it is determined in step S5605 that the reception of all of the data has been finished, the main controller unit 201 issues an instruction to close the connection to the LAN controller 211 of the NIC unit 210.

The LAN controller 211 which received such an instruction closes the connection in step S5606 in accordance with the formal procedure which has been predetermined by the TCP/IP protocol. When the reception of the print job sent from the print client 5004 as mentioned above is finished, the main controller unit 201 reads out the print job spooled on the HDD unit 207. The read-out data is in a state of a page description language called PDL (Page Description Language) and since it cannot be handled as print data in this state, a RIP (Raster Image Processing) process is executed in step S5607, thereby converting the PDL data into raster image data.

The raster image data obtained in this manner is once developed into the image memory unit 208 in step S5608 and an outputting process such as gamma conversion, edge emphasis, smoothing, etc. is executed in order to correct the raster image data into data suitable for printing onto the print paper (step S5609). The image data converted into the data suitable for printing in this manner is converted into a laser driving signal by the PWM unit 215 (step S5610). After that, it is sent to the printer unit 216.

In the printer unit 216, a printing process (step S5611) to print the image onto the print paper from the laser driving signal is executed. The printing process will now be described in detail with reference to FIG. 7.

In FIG. 7, reference numeral 5213 denotes the polygon mirror to which the laser beam is irradiated. The laser beam is irradiated onto the photosensitive drum 5217 via mirrors 5214, 5215, and 5216. The laser beam scans the photosensitive drum 5217 by the rotation of the polygon mirror 5213. Reference numeral 5230 denotes the developing unit for supplying black toner, thereby forming a toner image onto the photosensitive drum 5217 in accordance with the laser beam. The toner image is transferred onto the print paper, so that an output image can be obtained.

The print paper fed from one of the sheet cassettes 5234 and 5235 and the manual inserting tray 5236 passes through the resist roller 5237, is adsorbed onto the transfer belt 5238, and conveyed thereby. The toner has previously been developed on the photosensitive drum 5217 synchronously with paper feeding timing and the toner is transferred onto the print paper together with the conveyance of the print paper. The print paper onto which the toner has been transferred is separated from the transfer belt 5238, the toner is fixed onto the print paper by the fixing unit 5240. The print paper is ejected to the outside of the first image forming apparatus 5006 by the ejecting roller 5242.

In the case of performing the 2-side printing, however, the print paper is conveyed to the ejecting roller 5242 and, thereafter, the rotating direction of the ejecting roller 5242 is reversed, thereby guiding it to a paper re-feed conveying path by the flapper 5241. In the case of performing the multiplex recording, the print paper is guided to the paper re-feed conveying path by the flapper 5241 lest the print paper is conveyed to the ejecting roller 5242. The print paper guided to the paper re-feed conveying path is fed from the resist roller 5237 at the foregoing timing and the process to print the image onto the print paper is executed again.

When the printing process of the image data is finished in this manner, the print paper after completion of the printing is sent to the paper ejecting unit 217 and a paper ejecting process (step S5612) is executed. The controller unit 219 for controlling the paper ejecting apparatus controls various paper ejecting processes of the paper ejecting unit 217 by communicating with the main controller unit 201 via the I/O unit 218. The controller unit 219 conveys the print paper by using the paper feed motor driving unit 221 and controls the flow of the print paper by using the paper path control unit 223. While monitoring the flow of the print paper by using the paper sensor unit 220, the controller unit 219 controls the tray motor driving unit 222, thereby allowing the print paper to be ejected onto an arbitrary tray.

FIG. 8 is a cross sectional view showing a mechanical construction of the paper ejecting apparatus. In FIG. 8, reference numeral 5301 denotes the sample tray; 5302 the stack tray; and 5308 the booklet tray. In accordance with a kind of job or the number of print sheets which are ejected, the tray onto which the print paper is ejected is switched by the control of the controller unit 219.

On the stack tray 5302, the print sheets of paper before the ejection can be stacked every job and they can be bound by the stapler 5305 immediately before the ejection.

The Z-folding apparatus 5304 for folding the print paper into a Z-character shape and the puncher 5306 for forming two or three punch holes for filing are provided on a path in a range from the sample tray 5301 to the stack tray 5302 and execute each process in accordance with the kind of job.

The inserter 5303 is used for executing a middle inserting function. The print paper for middle insertion can be stacked into the inserter. Further, the saddle stitcher 5307 is used for folding the print paper in two in the booklet format and binding the print paper at the center. In this case, the print paper is ejected onto the booklet tray 5308.

The designation of each function in the paper ejecting unit as described above and the designation regarding other printing functions such as the number of prints, the number of copies, etc. are executed by the printer driver which is executed on the print client 5004 mentioned above (refer to FIG. 13).

The information designated here becomes control data and, at the time of the PDL converting process described in step S5407, it is embedded into the PDL data and sent to the first image forming apparatus 5006 and the control data is extracted by an RIP process in step S5607. In the control data, information necessary to form the image is referred to when the image data is developed into the image memory unit 208 in step S5608 and used for forming the image.

In the control data, information necessary for the paper ejecting process of the image is transferred to the controller unit 219 of the paper ejecting unit 217 by the main controller unit 201. The main controller unit 201 controls the paper ejecting apparatus on the basis of this information and executes the paper ejecting process.

The second image forming apparatus 5009 is constructed in a manner similar to the first image forming apparatus 5006 mentioned above and has similar ability and functions. However, the second image forming apparatus 5009 differs from the first image forming apparatus 5006 in that it is connected to the second LAN 5007, which is separated from the first LAN 5001 by the first router 5002 and the second router 5008.

Second System Example

Subsequently, as a second system example, a procedure which is executed until the print client 5004 transfers the image data converted into the image format to the first image forming apparatus 5006 by using dedicated file downloader and download protocol and prints an image will be explained.

Figure 16:
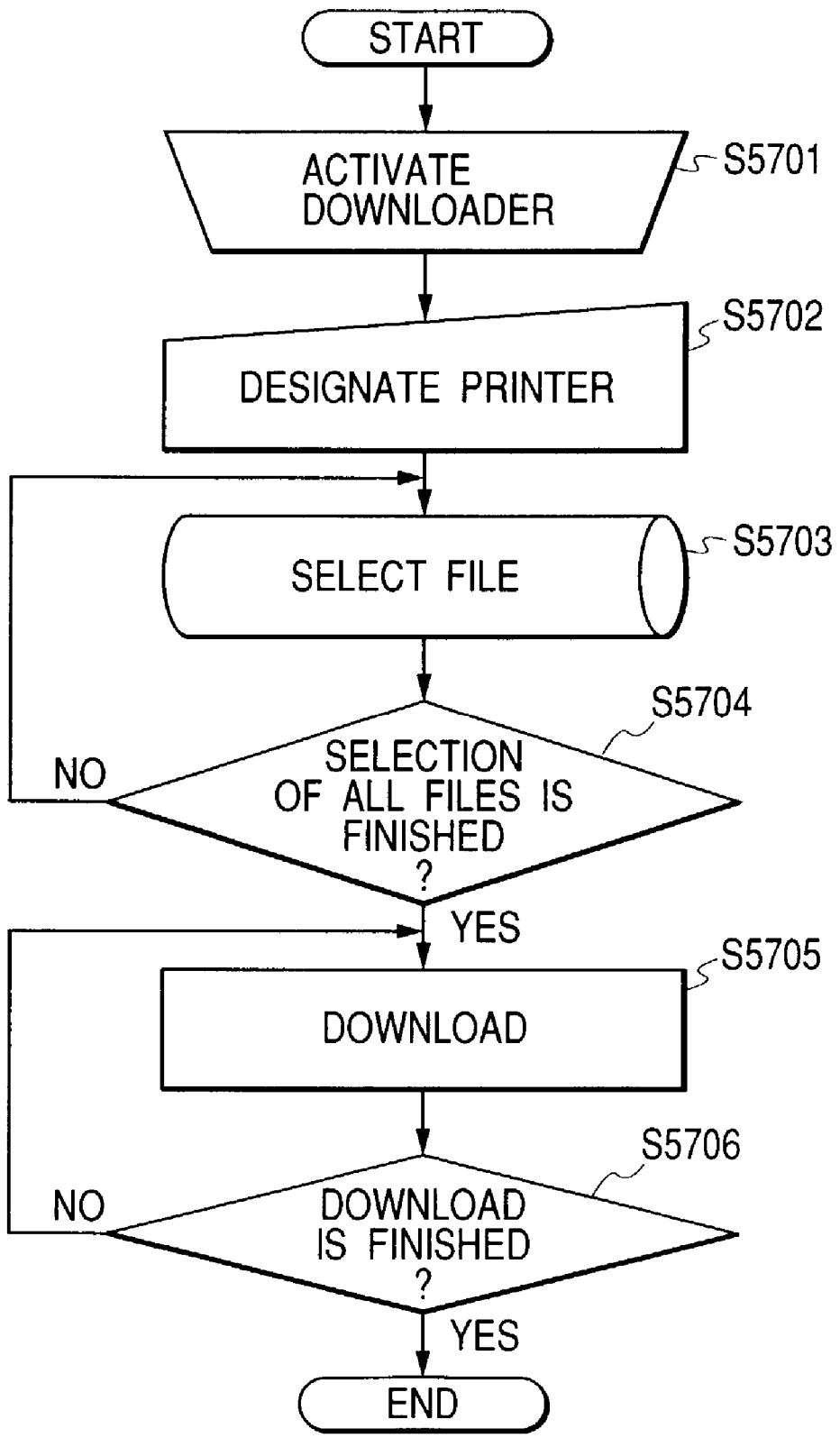
FIG. 16 is a flowchart showing a downloading process of data as a print target in a print client.

First, a procedure which is executed until the print data is transmitted from the print client 5004 to the first image forming apparatus 5006 will be explained with reference to a flowchart of FIG. 16.

The print client 5004 is a computer apparatus having a function for connecting to the first LAN 5001 by an NIC (Network Interface Card) or the like and has a memory medium such as a hard disk device or the like for storing information. The print client 5004 can hold the image data converted into the image format onto the memory medium. As a typical image format, for example, there can be mentioned a format such as PDF (Portable Document Format: Adobe Systems Incorporated in U.S.A.), TIFF (Tagged Image File format: Microsoft Corporation and Aldas Co., Ltd. in U.S.A.), JPEG (Joint Photographic Experts Group: ISO & ITU common standard), GIF (Graphics Interchange Format: Computer Serve Co., Ltd. in U.S.A.), or the like.

A dedicated downloading program has been installed in the print client 5004 in order to download the image data converted into the image format into the first image forming apparatus. The operator executes the downloading program and transmits the image data.

Figure 15:
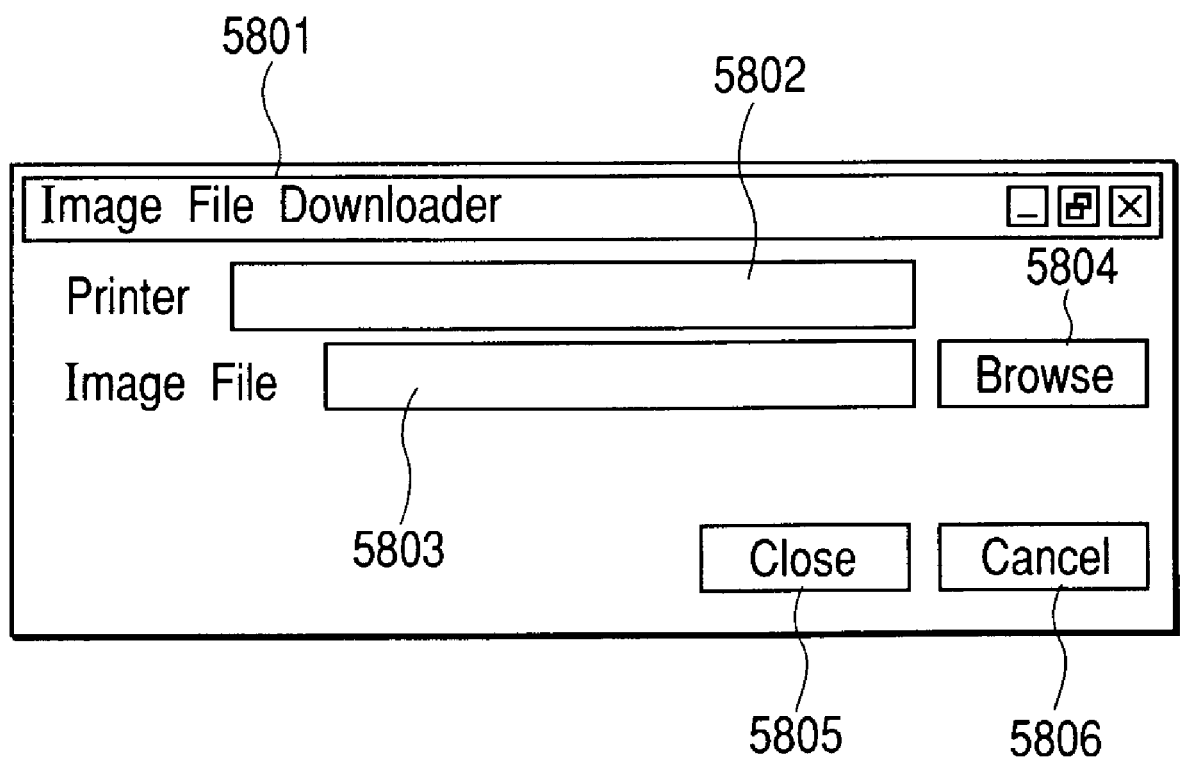
FIG. 15 is a diagram showing a GUI picture plane by a downloader program.

FIG. 15 shows a GUI for a downloader program. In FIG. 15, reference numeral 5801 denotes a window picture plane for an image downloader; 5802 an edit box for inputting a name, an IP address, or the like of a printer as a target to which the image data is downloaded; 5803 an edit box to designate the image data to be downloaded; 5804 a browse button which is used for browsing the image data from the memory medium; 5805 a close button to close the window; and 5806 a cancel button to cancel an input and close the window.

When the operator operates the print client 5004 and activates the downloading program in step S5701, he subsequently inputs the name or the IP address of the printer to the edit box 5802 and designates an image forming apparatus serving as a print target in step S5702. Subsequently, in step S5703, the operator designates the file to be downloaded by directly inputting it into the edit box 5803 or specifies the image data to be downloaded by operating the browse button 5804 and referring to the file stored in the memory medium.

Since there is also a case where a plurality of files are designated, whether the selection of all files has been finished or not is discriminated in step S5704. If it is not finished yet, the processing routine is returned to step S5703 and the designation of the file is continued. If it is determined in step S5704 that the selection of all of the files has been finished, the print client 5004 downloads the image data to the first image forming apparatus 5006 by using a dedicated downloading protocol in step S5705.

Subsequently, the end of the download is monitored in step S5706. The processes in steps S5705 and S5706 are repeated until the download is finished. If the download of all data has been finished, the downloader finishes the process.

As a method whereby the print client 5004 downloads the file to the first image forming apparatus 5006 in step S5705, besides the method of using the dedicated downloading protocol, for example, it can be also downloaded by using an FTP (File Transfer Protocol). In the case of using the FTP, a port of No. 21 of the TCP/IP is used. However, in the case of using a dedicated protocol, generally, an arbitrary port is selected from ports of undefined numbers and used.

A procedure which is executed until the first image forming apparatus 5006 receives the image data downloaded from the print client 5004 and prints an image onto the print paper on the basis of the received data will be described mainly with reference to a flowchart of FIG. 17.

Figure 17:
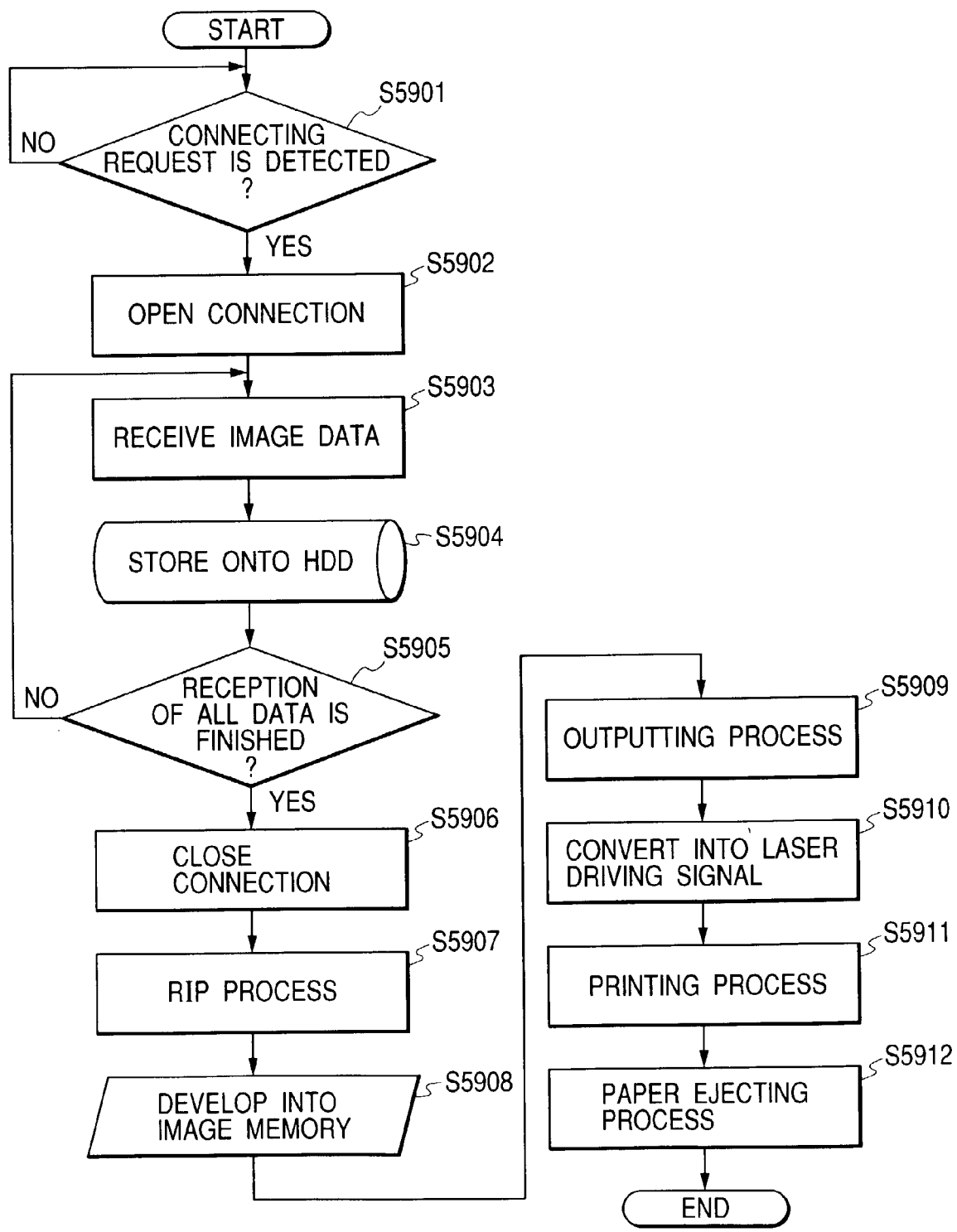
FIG. 17 is a flowchart showing the second example of the printing process of the image forming apparatus.
Figure 18:
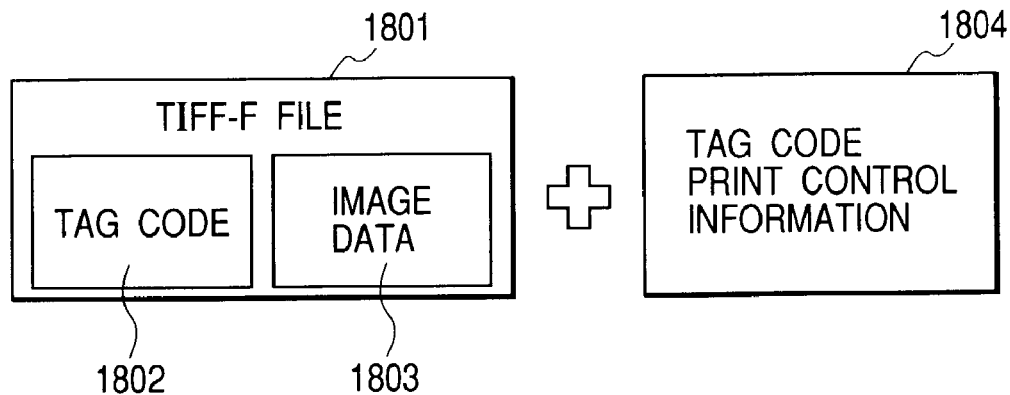
FIG. 18 is a diagram showing tag codes and image data in a file in a conventional TIFF-F format.
Figure 19:
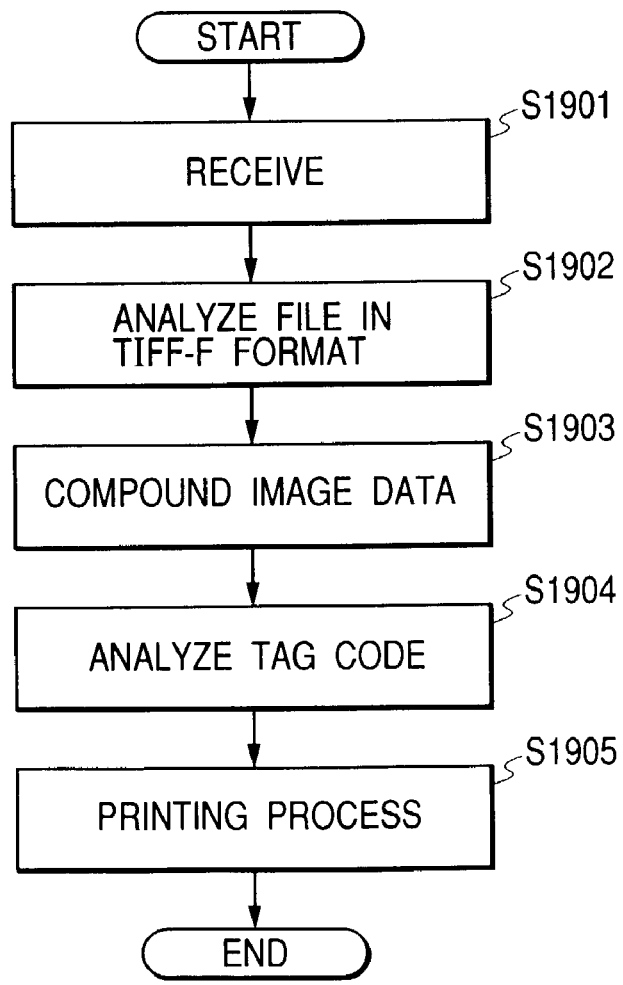
FIG. 19 is a flowchart for explaining the receiving and printing operations in the conventional apparatus.

FIG. 17 is the flowchart for the procedure which is executed until the first image forming apparatus 5006 receives the image data transmitted from the print client 5004 and prints an image onto the print paper on the basis of the received data.

In the case where the print client 5004 communicates with the first image forming apparatus 5006 via the first LAN 5001, for example, the TCP/IP protocol is used as a communication protocol. In the communication using the TCP/IP protocol, since it is necessary to open a connection between two hosts prior to starting the data communication, the print client 5004 transmits the connecting request (TCP segment in which the SYN bit is ON) to the first image forming apparatus 5006. This connecting request is sent from the NIC unit 210 to the first image forming apparatus 5006 via the first LAN 5001.

In the NIC unit 210, first, the voltage conversion of the reception data is performed by the transforming unit 212 and the resultant data is sent to the LAN controller 211. The LAN controller 211 monitors the connecting request in step S5901. If the connecting request is detected, the connection is opened in step S5902 in accordance with the formal procedure which has been predetermined by the TCP/IP protocol. When the connection is established between two points of the print client 5004 and the first image forming apparatus 5006 in this manner, the print client 5004 transmits the image data to the first image forming apparatus 5006 by using a dedicated downloader application and a dedicated downloading protocol. (The existing file transfer protocol such as an FTP protocol or the like can be also used.)

In the case of downloading the image data by using the dedicated downloading protocol, arbitrary one port is selected from the undefined ports among the TCP ports and the image data is downloaded from the print client 5004 to the first image forming apparatus 5006 (in the case of using the FTP, the port of No. 21 of the TCP/IP is used).

In the first image forming apparatus 5006, the image data which is sent by the downloading protocol is transmitted to the main controller unit 201 from the NIC unit 210 via the expansion bus 209. In the main controller unit 201, if it is determined that the reception data is the image data, while the image data is received in step S5903, the received image data is once spooled onto the HDD unit 207 in step S5904, and whether the reception of all data has been finished or not is discriminated in step S5905.

At this time, if it is determined that the reception of all of the data is not finished yet, the processing routine is returned to step S5903 and the processes in steps S5903 to S5905 are repeated. However, if it is determined in step S5905 that the reception of all of the data has been finished, the main controller unit 201 issues an instruction to close the connection to the LAN controller 211 of the NIC unit 210. In step S5906, the LAN controller 211 which received such an instruction closes the connection in accordance with the formal procedure which has been predetermined by the TCP/IP protocol.

When the reception of the print job sent from the print client 5004 as mentioned above is finished, the main controller unit 201 reads out the image data stored on the HDD unit 207. The read-out data is in a state of the image format such as a PDF or the like and since it cannot be handled as print data in this state, the RIP (Raster Image Processing) process is executed in step S5907, thereby converting the image format data into the raster image data. The raster image data obtained in this manner is once developed into the image memory unit 208 in step S5908 and the outputting process such as gamma conversion, edge emphasis, smoothing, etc. is executed in order to correct the raster image data into data suitable for printing by the output processing unit 214 of the printing unit 213 (step S5909). The image data converted into the data suitable for printing in this manner is converted into the laser driving signal by the PWM unit 215 (step S5910). After that, it is sent to the printer unit 216.

In the printer unit 216, a printing process (step S5911) for printing an image onto the print paper from the laser driving signal is executed.

Figure 1:
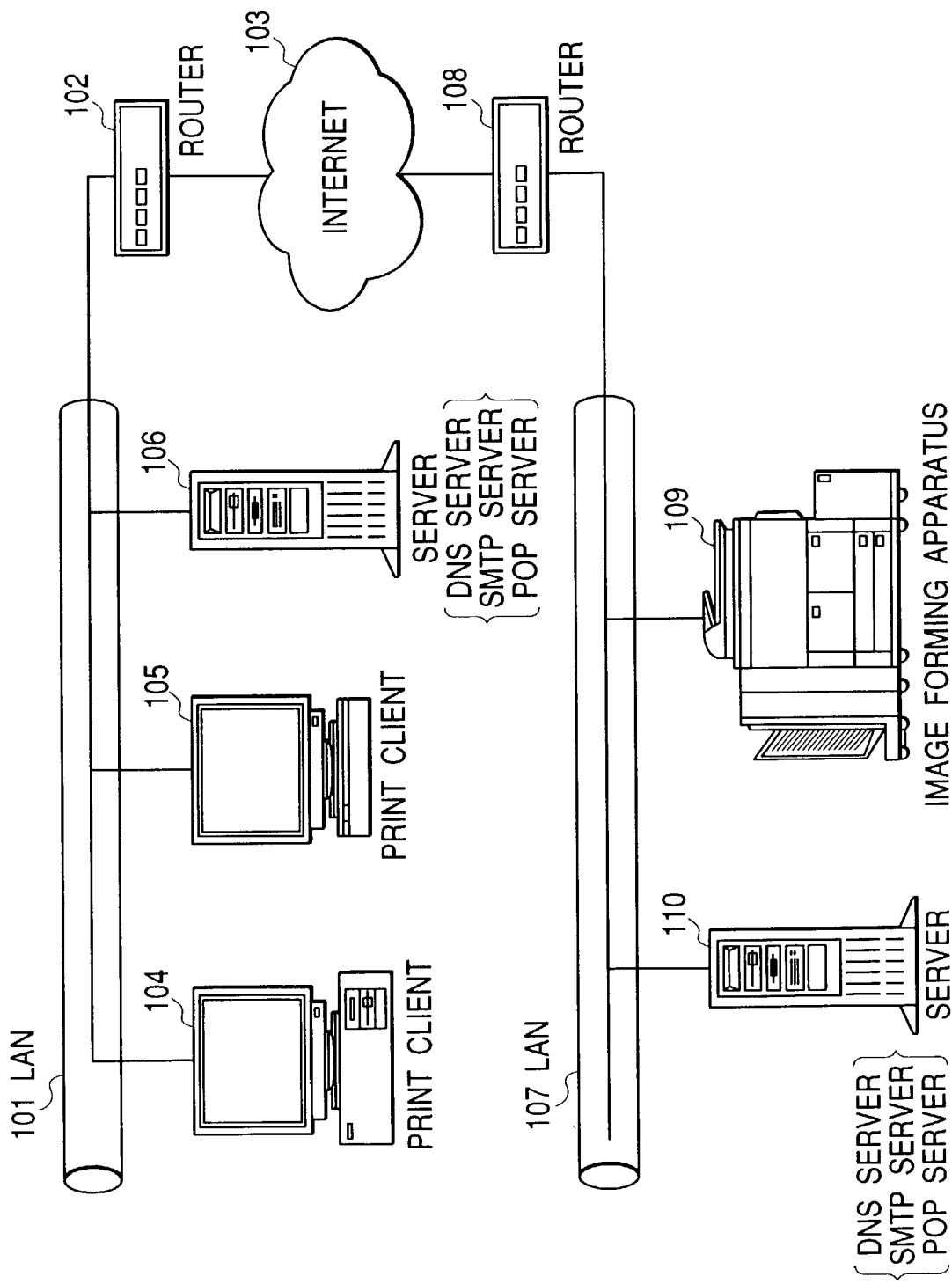
FIG. 1 is a system constructional diagram of an image forming system to which the invention is applied.

FIG. 1 is a system constructional diagram of an image forming system to which the invention is applied.

In FIG. 1, reference numeral 101 denotes a first LAN (Local Area Network); 102 a first router for connecting LANs of different segments and executing a relay, filtering, or the like of a data packet; 103 an Internet; 104 and 105 print clients serving as computer apparatuses; 106 a server apparatus for providing a DNS (Domain Name System) service, an SMTP (Simple Mail Transfer Protocol) service, a POP (Post Office Protocol) service, or the like; 107 a second LAN separated from the first LAN 101 by a router; 108 a second router; and 109 an image forming apparatus connected to the second LAN 107.

Although it is considered that, besides the above apparatuses, a plurality of computer apparatuses which can become print clients, a printer apparatus serving as an image forming apparatus, a server computer apparatus, a relay apparatus such as repeater, HUB, or the like for constructing a network, and the like are connected onto those LANs, respectively, they are omitted here.

FIG. 2 is a block diagram showing an electrical construction of the image forming apparatus 109.

In FIG. 2, reference numeral 201 denotes the main controller unit to control the whole image forming apparatus 109; 202 the operating unit to operate the image forming apparatus 109 by the operator; 203 the I/O unit for allowing the operating unit 202 to communicate with the main controller unit 201; 204 the LCD unit to provide information to the operator and display virtual switches; 205 the touch panel unit to detect the operation of the virtual switch displayed on the LCD unit 204; and 206 the switching unit arranged physically so as to allow the operator to execute an operation.

Reference numeral 207 denotes the HDD unit which is used for storing the print data or a program or used as a cache area of the data; 208 the image memory unit which is used for developing or modifying a print image; 209 the expansion bus which is used for expanding functions into the image forming apparatus 109; 210 the NIC (Network Interface Card) unit added to the image forming apparatus 109 by using the expansion bus 209; and 211 the LAN controller. The LAN controller 211 is used to control in a manner such that the communication packet flowing on the first LAN 101 is monitored, only the information having a relation with the image forming apparatus 109 is fetched into the LAN controller 211, or the packet formed by the image forming apparatus 109 is sent to the first LAN 101. Reference numeral 212 denotes the transforming unit for performing a voltage conversion and realizing physical communication between the image forming apparatus 109 and the first LAN 101; 213 the printing unit for printing an image onto the print paper as a recording media; and 214 the output processing unit for executing processes such as gamma conversion, edge emphasis, smoothing, etc. in order to correct the image data which is sent by the main controller unit to the data suitable for printing onto the print paper.

Reference numeral 215 denotes the PWM unit for converting the output-processed image data into the signal for driving the laser beam; 216 the printer unit for printing the image onto the print paper on the basis of the signal supplied by the laser beam; 217 the paper ejecting unit for ejecting the printed paper formed by the printing unit 213 to the outside of the image forming apparatus 109; 218 the I/O unit for allowing the paper ejecting unit 217 to communicate with the main controller unit 201; 219 the controller unit for controlling the paper ejecting unit 217; 220 the paper sensor unit for monitoring the flow of the print paper which passes in the paper ejecting unit 217; 221 the paper feed motor driving unit for driving a motor for feeding the print paper; 222 the tray motor driving unit for driving a paper ejecting tray; and 223 the paper path control unit for controlling the flow of the print paper.

The operation of the image forming apparatus and the communication system of the invention will now be described with reference to FIGS. 1 and 2 mentioned above and flowcharts of FIGS. 4 and 6.

Figure 4:
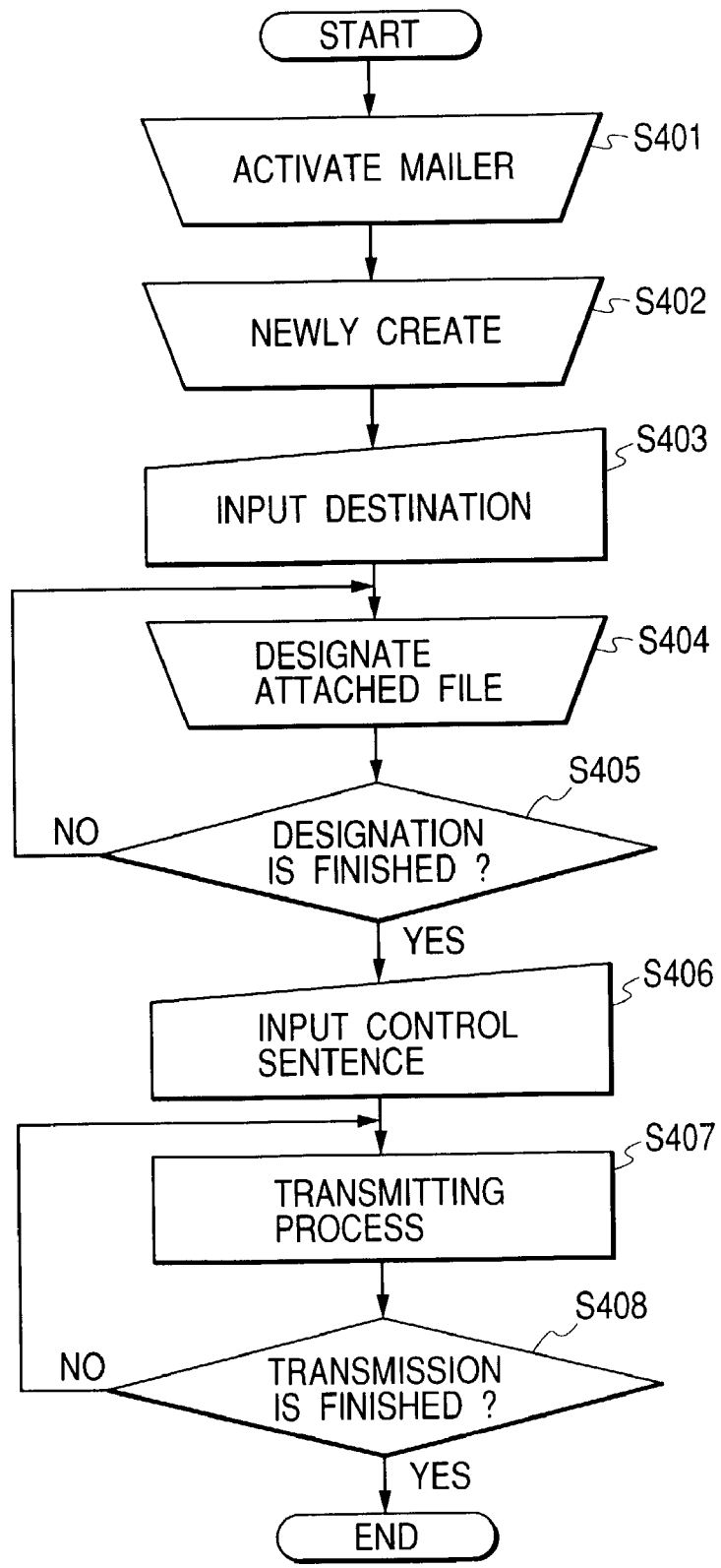
FIG. 4 is a flowchart showing processes of a print client in an embodiment of the invention.

Subsequently, a procedure which is executed until the print clients 104 and 105 transmit the image data to the image forming apparatus 109 will be described with reference to the flowchart of FIG. 4.

The print clients 104 and 105 are computer apparatuses having a function for connecting to the first LAN 101 by the NIC (Network Interface Card) or the like and the image data to be printed is held in the memory medium or the like. The operator operates the print client 104 and activates E-mail forming software called a mailer in step S401.

Figure 3:
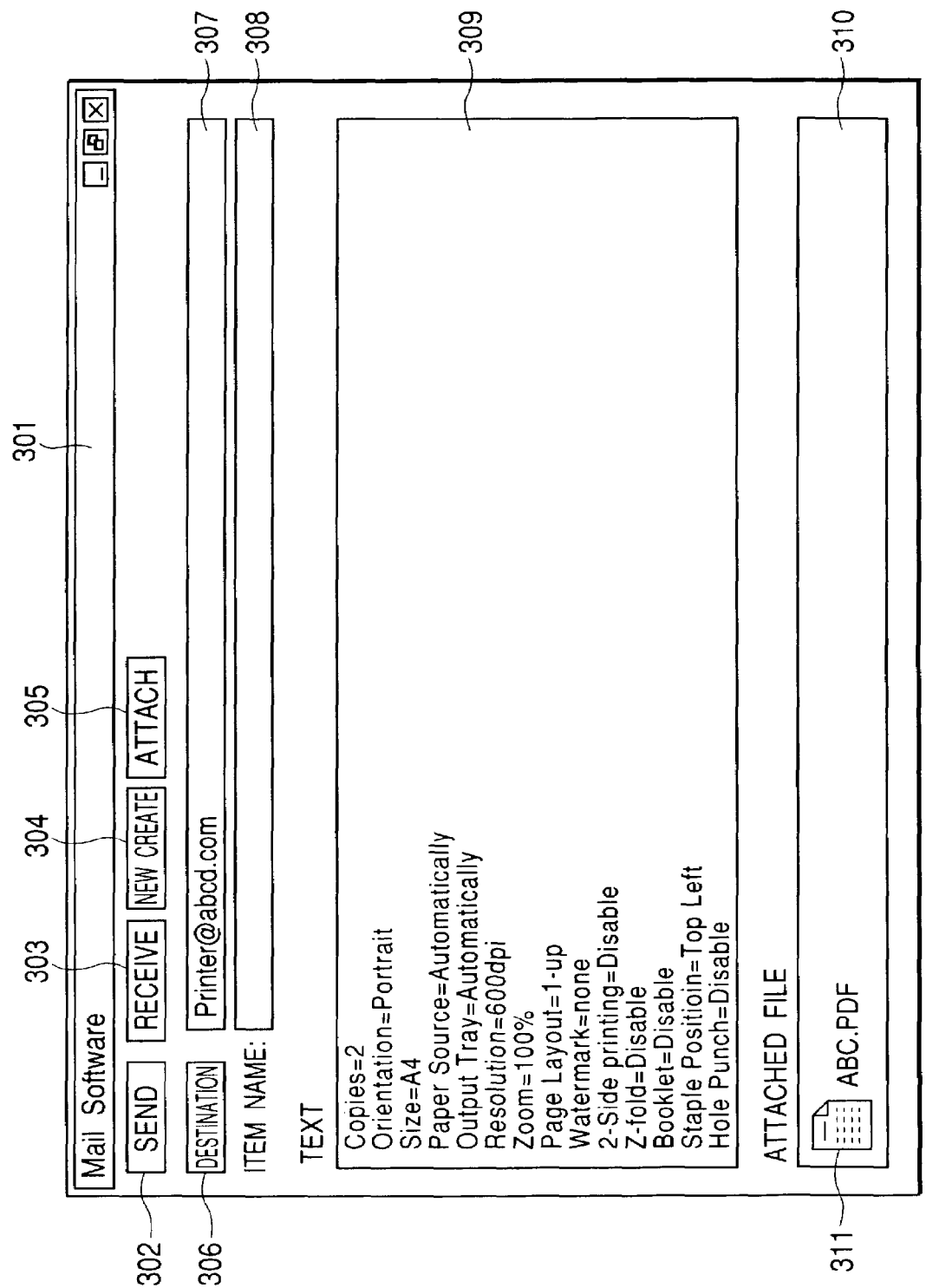
FIG. 3 is a diagram showing a GUI picture plane by a mailer.

FIG. 3 shows a GUI which is realized by the mailer implemented in the print clients 104 and 105. In FIG. 3, reference numeral 301 denotes a window picture plane of the mailer; 302 a send button to transmit mail; 303 a receive button to receive the mail; 304 a new create button to newly form mail; 305 an attach button to attach a file such as image data or the like to the mail; 306 a destination button to refer to an address book in which destinations of mail have been stored; 307 an edit box to input the destination of the mail; 308 an edit box to input an item name of the mail; 309 a text box to input a text portion of the mail; 310 a window to graphically display the attached file; and 311 an icon and a file name indicative of a file attached to the mail.

When the operator presses the new create button 304 of the mailer and instructs the mailer to newly form mail in step S402, he subsequently inputs the destination to the edit box 307 in step S403. The destination which is designated here denotes an E-mail address corresponding to the image forming apparatus 109 which intends to transmit the image data and print. Such an E-mail address has generally been registered in the address book which the mailer owns and can be selectively designated by using a mouse or the like by calling the address book by using the destination button 306.

Subsequently, the operator presses the attach button 305 in order to select the image data whose printing is desired by the image forming apparatus 109 in step S404. When the attach button 305 is pressed, the mailer displays a file list of the image data or the like stored in the memory medium of the print client 104 and displays a GUI for urging the operator to select the file to be attached. Since a plurality of attached files can be also selected, the mailer confirms the end of designation of the attached file in step S405. The processes in steps S404 and S405 are repeated until the operator finishes the designation of the attached file. The file attached here is graphically displayed onto the window 310 by the icon and file name 311 of the attached file. If it is determined in step S405 that the designation of the attached file has been finished, the operator inputs control sentences for the printing and the paper ejecting process into the text box 309 in step S406.

FIG. 5 shows a format of the control sentences which can be inputted by the operator. In FIG. 5, reference numeral 501 denotes a column in which a control item has been written; 502 a column in which a set width of a value corresponding to each control item has been written; 503 a column in which an initial value has been written every set item; 504 a row in which control information regarding the number of print copies has been written; 505 a row in which control information regarding a print orientation has been written; 506 a row in which control information regarding a paper size has been written; 507 a row in which control information regarding a paper feeding place has been written; 508 a row in which control information regarding a paper ejecting place has been written; and 509 a row in which control information regarding resolution has been written.

Reference numeral 510 denotes a row in which control information regarding a zoom ratio (enlargement/reduction magnification) has been written; 511 a row in which control information regarding a page layout has been written; 512 a row in which control information regarding a watermark, watermark printing, or the like has been written; 513 a row in which control information regarding a 2-side printing has been written; 514 a row in which control information regarding Z-folding printing has been written; 515 a row in which control information regarding booklet printing has been written; 516 a row in which control information regarding a staple position has been written; and 517 a row in which control information regarding a hole punch has been written.

After the operator inputted the control sentences for the printing and the paper ejecting process into the text box 309 of the mailer in accordance with the format of FIG. 5, when he presses the send button 302, the transmitting process of E-mail from the print client 104 is started in step S407. In step S408, the mailer discriminates whether the transmission of the whole E-mail data has been finished or not. The processes in steps S407 and S408 are repeated until the transmission is finished. If it is determined in step S408 that the transmission of the whole E-mail data has been finished, the mailer finishes the process.

The E-mail data transmitted from the print clients 104 and 105 is once fetched into the server apparatus 106 which is executing an SMTP service and, thereafter, the mail is distributed by a function of an SMTP server. At this time, a domain is specified by a DNS server on the basis of the mail address inputted by the operator in step S403 and the mail is sent to the designated destination. In the embodiment, since the image forming apparatus 109 is designated as a destination of the mail, the E-mail data transmitted from the server apparatus 106 passes through the router 102, Internet 103, and router 108 and, thereafter, is fetched into a mail box of a server apparatus 110 by the SMTP service which is being executed in the server apparatus 110 installed in the same domain as that of the image forming apparatus 109.

Figure 6:
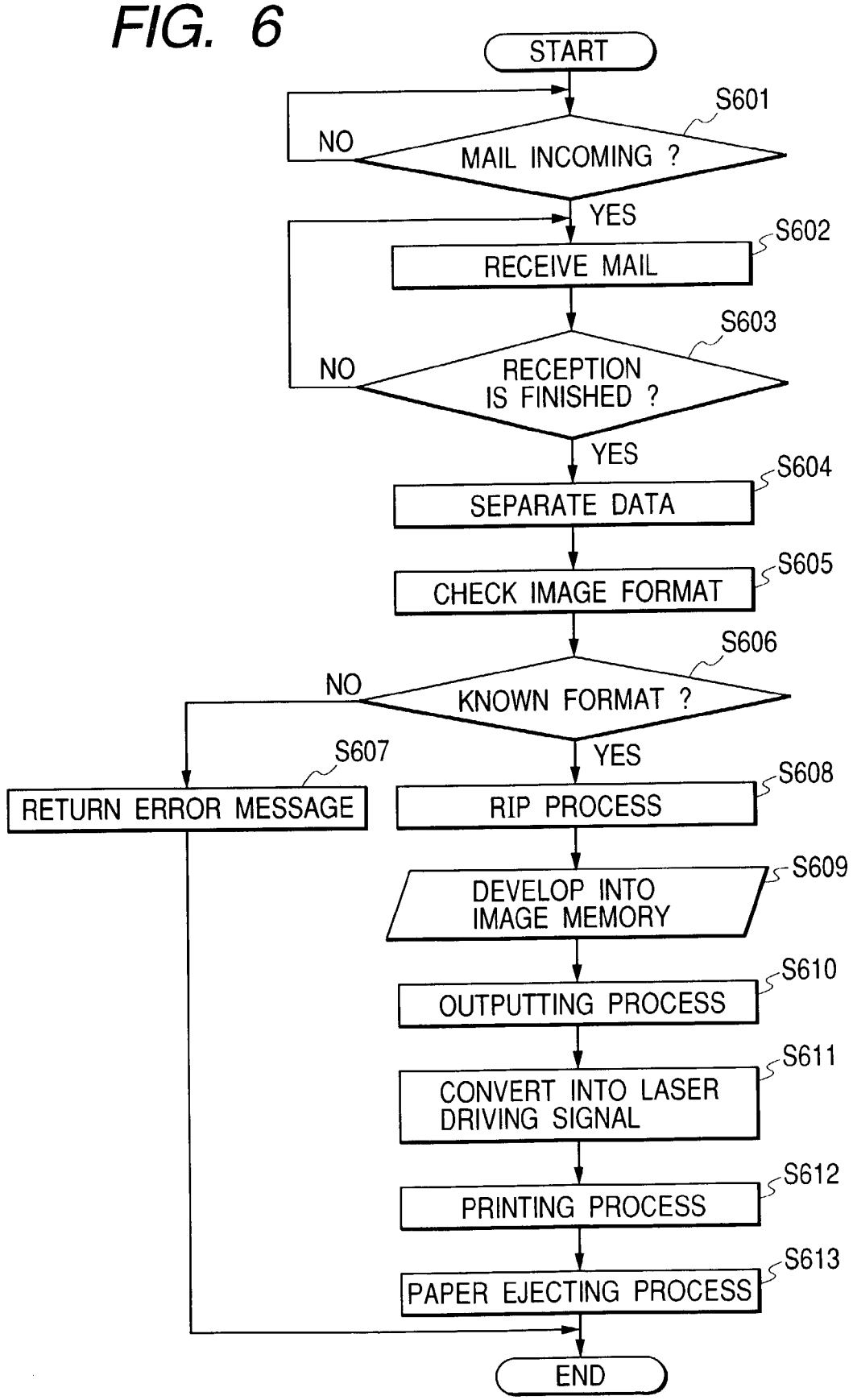
FIG. 6 is a flowchart showing processes of an image forming apparatus in the embodiment of the invention.

Subsequently, a procedure which is executed until the image forming apparatus 109 receives the image data sent from the print client 104 in a form such that it is attached to the E-mail and prints it onto the print paper will be described with reference to the flowchart of FIG. 6.

In step S601, the image forming apparatus 109 confirms whether the E-mail to the self apparatus has reached or not by periodically accessing the server apparatus 110. Since a POP (Post Office Protocol) service is executed in the server apparatus 110, the image forming apparatus 109 transmits a user ID and a user password to the server apparatus 110 by using the POP and can confirm whether the E-mail has reached the own mail box or not.

If the E-mail has reached, the main controller unit 201 of the image forming apparatus 109 receives the E-mail data from the server apparatus 110 by using the POP via the expansion bus 209, the NIC unit 210, and the second LAN 107 (step S602) and confirms whether the reception of the whole E-mail data has been finished or not (step S603). If the reception is not finished yet, the processes in steps S602 and S603 are repetitively executed. If it is determined in step S603 that the reception of the whole E-mail data has been finished, step S604 follows and a process for separating the received E-mail data into three blocks of a header portion, text portion, and an attached file portion is executed.

The E-mail is generally constructed in a message format according to a standard of an MIME (Multipurpose Internet Mail Extensions). The E-mail data attached with the file is constructed by a Multipart type and to a boundary of blocks, a unique character train showing the boundary is supplied by a boundary parameter in a Content-Type field. Therefore, by searching the character train, the text portion and the attached file portion of the mail can be easily separated.

Similarly, since the file name of the attached file is supplied by a name parameter of Content-Type, by checking an extension of the supplied file name in step S605, the image format can be specified. Thus, whether the image data received by the attached file is in the known image format which can be developed by the image forming apparatus 109 or not is discriminated in step S606. As a result of the discrimination, if it is determined that the image data is not in the known image format, the image forming apparatus 109 returns E-mail describing an error message to the print client 104 as a sender of the E-mail (step S607) and finishes the process. In this error message, a message showing that the image data is in the image format which cannot be processed by the image forming apparatus 109 is disclosed in the text portion of the E-mail.

If it is determined in step S606 that the image data is in the known image format, it is in a state of the image format data at this stage and the image data cannot be handled as print data in this state. Therefore, after the image data was decoded by the main controller unit 201, the RIP (Raster Image Processing) process is executed in step S608, thereby converting the image data into raster image data.

The raster image data obtained in this manner is once developed into the image memory unit 208 in step S609 and an outputting process such as gamma conversion, edge emphasis, smoothing, etc. is executed by the output processing unit 214 of the printing unit 213 in order to correct the raster image data into data suitable for printing onto the print paper (step S610).

The image data converted into the data suitable for printing in this manner is converted into the laser driving signal by the PWM unit 215 (step S611). After that, it is sent to the printer unit 216.

In the printer unit 216, a printing process (step S612) to print the image onto the print paper from the laser driving signal is executed. The printing process will now be described in detail with reference to the cross sectional view of the monochromatic image forming apparatus in FIG. 7.

In FIG. 7, reference numeral 5213 denotes the rotatable polygon mirror. The laser beam corresponding to the image data is irradiated onto the polygon mirror 5213 and reflected to the right and left by the rotation of the mirror, thereby exposing and scanning the photosensitive drum 5217 and forming a latent image onto the photosensitive drum 5217. At this time, the laser beam passes through the mirrors 5214, 5215, and 5216 and is irradiated onto the photosensitive drum 5217. Reference numeral 5230 denotes the developing unit for supplying black toner. The latent image formed on the photosensitive drum 5217 is developed by the toner and a toner image according to the development is transferred onto the print paper.

The print paper fed from one of the sheet cassettes 5234 and 5235 and the manual inserting tray 5236 passes through the resist roller 5237, is adsorbed onto the transfer belt 5238, and conveyed thereby. In this instance, the toner image has been formed on the photosensitive drum 5217 synchronously with paper feeding timing and the toner image is transferred onto the print paper in association with the conveyance of the print paper. The print paper onto which the toner image has been transferred is separated from the transfer belt 5238 and the toner image is fixed onto the print paper by the fixing unit 5240. The print paper is ejected to the outside of the image forming apparatus 109 by the ejecting roller 5242.

In the case of performing the 2-side printing, however, the print paper is conveyed to the ejecting roller 5242 and, thereafter, the rotating direction of the ejecting roller 5242 is reversed, thereby guiding it to a paper re-feed conveying path by the flapper 5241. In the case of performing the multiplex recording, the print paper is guided to the paper re-feed conveying path by the flapper 5241 lest the print paper is conveyed to the ejecting roller 5242. The print paper guided to the paper re-feed conveying path is fed from the resist roller 5237 at the foregoing timing and the process to print the image onto the print paper is executed again.

When the printing process of the image data is finished in this manner, the print paper after completion of the printing is sent to the paper ejecting unit 217 and a paper ejecting process (step S613) is executed. The controller unit 219 for controlling the paper ejecting apparatus controls various paper ejecting processes of the paper ejecting unit 217 by communicating with the main controller unit 201 via the I/O unit 218. The controller unit 219 conveys the print paper by using the paper feed motor driving unit 221 and controls the flow of the print paper by using the paper path control unit 223. While monitoring the flow of the print paper by using the paper sensor unit 220, the controller unit 219 controls the tray motor driving unit 222, thereby allowing the print paper to be ejected onto an arbitrary tray.

FIG. 8 is the cross sectional view of the paper ejecting apparatus. In FIG. 8, reference numeral 5301 denotes the sample tray; 5302 the stack tray; and 5308 the booklet tray. In accordance with the kind of job or the number of print sheets which are ejected, the tray onto which the print paper is ejected is switched by the control of the controller unit 219.

On the stack tray 5302, the print sheets of paper before the ejection can be stacked every job and they can be bound by the stapler 5305 just before the ejection.

The Z-folding apparatus 5304 for folding the print paper into a Z-character shape and the puncher 5306 for punching two or three holes for filing are provided on a path in a range until the print paper reaches the sample tray 5301 and the stack tray 5302 and execute each process in accordance with the kind of job.

The inserter 5303 is used for executing the middle inserting function. The print paper for middle insertion can be stacked into the inserter. Further, the saddle stitcher 5307 is used for folding the print paper in two in the booklet format and binding the print paper at the center. In this case, the print paper is ejected onto the booklet tray 5308.

The control data to control the printing and the paper ejecting process which was inputted by the operator in step S406 is separated in step S604. After that, in step S609, it is referred to when the image data is developed into the image memory unit 208 and is used for forming an image. In the control data, information necessary for the paper ejecting process of the image is transferred to the controller unit 219 of the paper ejecting unit 217 by the main controller unit 201. On the basis of the information, the controller unit 219 controls the paper ejecting apparatus and executes the paper ejecting process.

The case where the control data which is supplied from the print clients 104 and 105 to the text portion of the E-mail is used for the printing and the paper ejection is limited to the case where the data attached to the E-mail is in the image data format. If the data attached to the E-mail is the PDL data, since the control data which is necessary for the printing and the paper ejection has been embedded in the PDL data, the image forming apparatus 109 executes the printing process and the paper ejecting process on the basis of the control data.

Figure 9:
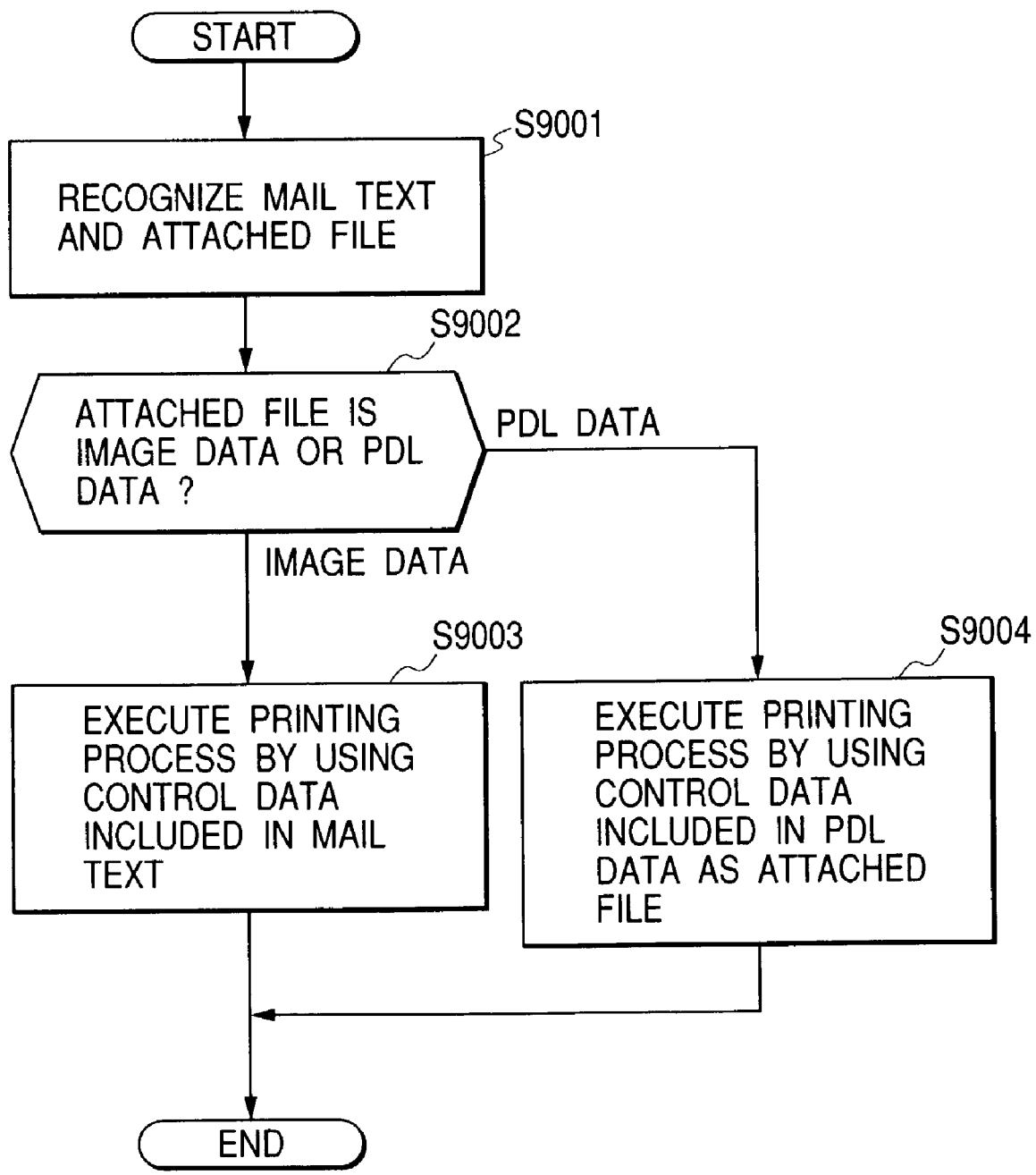
FIG. 9 is a flowchart showing an example of a selecting process of control data by the image forming apparatus according to the embodiment of the invention.

That is, as shown in FIG. 9, with respect to the E-mail which was transmitted from the print clients 104 and 105 and received via the server apparatus 106, the main controller unit 201 of the image forming apparatus 109 identifies the header portion, mail text (text portion), and attached file on the basis of the boundary parameter mentioned above (step S9001). Subsequently, if the attached file is identified, whether the data enclosed in the attached file is the image data as a preferred example of the data which does not include the print control data of the invention or the PDL data as a preferred example of the data which includes the print control data of the invention is discriminated on the basis of the extension of the file name mentioned above (step S9002).

Thus, if it is the image data, the main controller unit 201 instructs the printing unit 213 and the paper ejecting unit 217 so as to print the image data enclosed in the attached file by using the control data included in the text portion of the E-mail (step S9003). If the data is the PDL data, the main controller unit 201 instructs the printing unit 213 and the paper ejecting unit 217 so as to print the PDL data enclosed in the attached file by using the control data included in the PDL data (step S9004).

If the main controller unit 201 instructs so as to print the image data enclosed in the attached file by using the control data included in the text portion of the E-mail, whether the control data is the control data necessary for the process of either the printing unit 213 or the paper ejecting unit 217 is discriminated. The control data is selectively transferred to either the printing unit 213 or the paper ejecting unit 217 in which it is determined to be necessary. In this case, the control data which is necessary in the printing unit 213 (for example, the 1-side printing, 2-side printing, or the like) is added to the image data and transferred to the printing unit 213. The control data which is necessary in the paper ejecting unit 217 is solely transferred to the paper ejecting unit 217.

As mentioned above, in the embodiment, the print clients 104 and 105 transmit the data whose printing is desired as an attached file of the E-mail to the image forming apparatus. The E-mail is set so as to have a data structure of the header portion, text portion, and attached file and the control data which is necessary when the data enclosed in the attached file is printed is embedded into the text portion.

The image forming apparatus 109 separates the received E-mail into the header portion, text portion, and attached file and discriminates whether the data regarding the attached file is the image data or the PDL data described by the PDL. In the case of the image data, the image data is printed on the basis of the control data included in the text portion. In the case of the PDL data, the PDL data is printed on the basis of the control data included in the PDL data.

By transmitting the data as a print target as an attached file of the E-mail to the image forming apparatus as mentioned above, even if the client apparatus which requests the printing of the data and the image forming apparatus to print the requested data are connected to the different networks separated by the router, the data as a print target can be transmitted to the image forming apparatus and printed.

That is, with respect to the routers 102 and 108 connected to the Internet, generally, the port of No. 25 for the SMTP is opened in order to enable the computer apparatus in the Intranet to use the E-mail. Therefore, in the print system of the invention using the SMTP protocol, in a network environment which can use the E-mail, it is possible to print by using the image forming apparatus 109 existing out of the segments regarding the router 102 to which the client apparatuses 104 and 105 belong.

The control data for controlling the printing, for example, the number of print copies or the like is embedded into the text portion of the E-mail and the embedded E-mail is transmitted. Therefore, the operation to download the data as a print target into the image forming apparatus the number of times corresponding to the number of print copies in the case of printing a plurality of copies as in the conventional system is unnecessary. Even in the case of a plurality of print copies, it is always sufficient to transmit the data once.

By allowing the image forming apparatus to have the functions such that the received E-mail is separated into the header portion, mail text (text portion), and attached file, whether the data as a print target enclosed in the attached file is the image data or the PDL data is discriminated, whether the control data embedded in the text portion of the E-mail or the control data included in the PDL data is used as control data which is used at the time of printing the print data is discriminated in accordance with the discrimination result, and the printing process is executed, the data as a print target attached to the E-mail can be properly printed.

The image forming apparatus in which the following three programs have been implemented is shown above: that is, the program for identifying the text portion and the attached file with respect to the E-mail transmitted from the client apparatus to the image forming apparatus; the program for recognizing the control data which can be described in the text of the E-mail and the control data which can be enclosed in the attached file identified by the identifying means; and the program for controlling the printing process in accordance with the recognition result which is outputted by the recognizing program and shows whether at least either the text portion or the attached file identified by the identifying means includes the control data or not.

For example, if the recognizing program recognized a situation where the attached file is constructed by the PDL data including the print control data and, further, the control data to control the printing apparatus is also included in the text portion of the mail, the printing process can be also executed by using either the control data included in the attached file or the control data included in the text portion of the E-mail.

If the printing process is executed by using the control data included in the text portion of the E-mail, there is an effect such that the print result which is desired by the user can be obtained by the control data included in the text portion of the PDL data without making the user confused. On the other hand, if the printing process is executed by preferentially using the control data included in the attached file, there is an effect such that it is possible to execute the printing process to which the intention of the creator of the attached file is reflected by respecting the control data set in the attached file. It is preferable if the setting about which one of the control data in the text portion and the control data in the attached file is preferentially used can be changed in accordance with a request of the user by a host apparatus on a transmitting source side of the E-mail.

Figure 10:
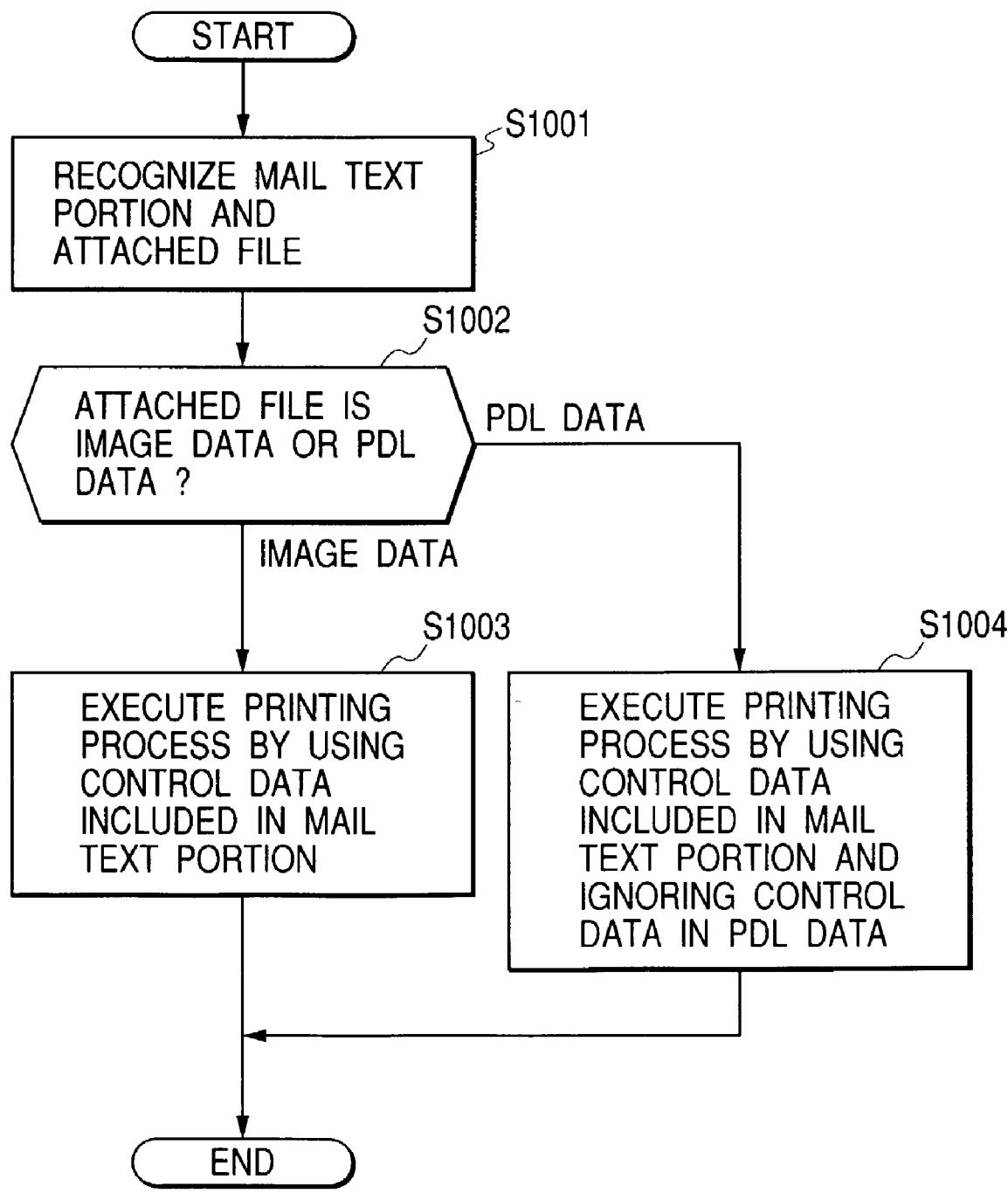
FIG. 10 is a flowchart showing another example of the selecting process of the control data by the image forming apparatus according to the embodiment of the invention.

In a flowchart shown in FIG. 9, in the case of printing the PDL data, the printing process is executed on the basis of the control data included in the PDL data. As shown in FIG. 10, however, the PDL data can be also printed by using the control data included in the E-mail by ignoring the control data included in the PDL data (step S1004).

In this case, it is sufficient to embed the control data indicative of such a process into the text portion of the E-mail. According to processes as shown in FIG. 10, for example, in the case where the user wants to change the set data such as the number of print copies, 1-side/2-side printing, or processing method (Z-fold, booklet process, etc.) of the ejected print paper or in the case where the user wants to add control contents, the troublesome work to correct the PDL data is unnecessary, the GUI (Graphic User Interface) function of the mailer is used by the client apparatuses 104 and 105 (refer to FIGS. 3 and 4) and such a change can be easily and promptly instructed.

With respect to the control items which are not included in the PDL data, the printing process and the paper ejecting process are executed by using initial values which have been preset in the image forming apparatus 109.

Since the initial values which have been preset in the image forming apparatus 109 are automatically displayed to the client apparatuses 104 and 105 on the GUI picture plane displayed by the mailer shown in FIG. 3 (refer to the column 503 in FIG. 5), the user does not need to input all kinds of control data regarding those initial values but it is sufficient to input only the control data of the kinds which he wants to correct onto the GUI picture plane. Therefore, the methods for the printing process and the paper ejecting process can be easily, accurately, and promptly instructed.

As control data, the client apparatuses can set one or a plurality of designation items among the number of print copies, paper orientation, paper size, paper feeding place, paper ejecting place, resolution, enlargement/reduction (zoom), page layout, watermarked characters, 2-side printing, Z-folding process, booklet process, staple position, and hole punch.

The invention is not limited to the foregoing embodiment. For example, in addition to the printing of the PDL data using either the control data included in the PDL data or the control data described in the text portion of the E-mail, the printing of the PDL data can be executed using both of the control data included in the PDL data and the control data described in the text portion of the E-mail.

In this case, if a value of 2 copies is designated in the case of the PDL data and a value of 10 copies is designated in the case of the text portion of the E-mail with respect to the same kind of control data, for example, the number of print copies, the value of 10 copies designated in the text portion of the E-mail is preferentially selected and 10 copies are printed. For example, if the control data to instruct the 1-side/2-side printing is not described in the PDL data but the control data to instruct the 2-side printing is described in the text portion of the E-mail, the 2-side printing is executed. In this manner, with respect to the control item such that there is an instruction in one of the PDL data and the text portion of the E-mail but there is no instruction in the other, the printing process or the paper ejecting process based on the control on the side where the instruction exists is executed.

In the embodiments, the control item 501 and its value are separated by an equal sign as disclosed in the text box 309 for inputting the control sentences of the mailer. That is, the image forming apparatus 109 uses the equal sign as an end sign of the control item and, as for the value, the end can be discriminated by a "new paragraph" operation. However, naturally, the set items and the end sign of the value can be inputted from a keyboard and can be substituted by any symbols excluding alphabets and numerals.

Further, the invention is not limited to the monochromatic image forming apparatus but can be also applied to a color image forming apparatus such as color printer, color copying apparatus, or the like.

As described above, according to the embodiments of the invention, it is possible to flexibly cope with various data formats.

Moreover, whether the data attached to the E-mail is the image data or the data including the print control information is discriminated. On the basis of the discrimination result, if it is the image data, the printing process is executed in accordance with the control data which is supplied by the text portion of the E-mail. If it is the data including the print control information, the printing process is executed in accordance with the control data embedded in the data including the print control information. By this process, for example, there is an effect such that even in the case of printing a plurality of copies of the image data, a plurality of copies can be printed by transmitting the data once, and in the case of printing the data including the print control information, it is possible to perform the printing to which the intention of the creator who forms the data including the print control information is reflected.

Further, even if the data attached to the E-mail is the image data or the data including the print control information, by executing the printing process in accordance with the control data which is supplied by the text portion of the E-mail, there is an effect such that the print result which is desired by the user can be obtained. Moreover, when data including print control information formed by the third party is also used and printed, there is an effect such that the print output can be obtained without needing to form the data including the print control information again.

What is claimed is:

1. An image forming apparatus for printing data whose printing has been requested from a client apparatus via a network, comprising:

identifying means for identifying a text portion and an attached file with respect to E-mail transmitted from the client apparatus;

recognizing means for recognizing control data which can be included in the text portion of the E-mail and control data which can be included in the attached file identified by said identifying means, both sets of control data being related to a print setting;

discrimination means for discriminating whether or not the control data is included in both the text portion and in the attached file identified by said identifying means based on a recognition by said recognizing means;

selecting means for selecting one set of control data, either the control data included in the text portion or the control data included in the attached file, in order to avoid conflict between a setting provided in the control data included in the text portion and a setting provided in the control data included in the attached file, when said discrimination means discriminates that the control data is included in both the text portion and in the attached file; and control means for controlling a printing process using the one set of control data selected by said selecting means when said discrimination means discriminates that the control data is included in both the text portion and in the attached file.

2. An apparatus according to claim 1, wherein the client apparatus and said image forming apparatus are connected to different networks separated by a router.

3. An apparatus according to claim 1, wherein said recognizing means recognizes whether data included in the attached file is data including no control data or data including the control data.

4. An apparatus according to claim 3, wherein if it is recognized by said recognizing means that the data included in the attached file is data including no control data, said control means controls the printing process of the data which does not include the control data on the basis of the control data included in the text portion of the E-mail.

5. An apparatus according to claim 3, wherein if it is recognized by said recognizing means that the data included in the attached file is data including the control data, said control means controls the printing process of the data including the control data on the basis of the control data included in the data that is included in the attached file.

6. An apparatus according to claim 1, wherein in the text portion or in the attached file identified by said identifying means, if it is recognized by said recognizing means that both of the text portion and the attached file include the control data, the printing process of the attached file identified by said identifying means is controlled on the basis of the control data included in the text portion.

7. An apparatus according to claim 1, wherein with respect to a control item which is not included in the control data, said control means controls the control item by using an initial value which has been predetermined by said image forming apparatus.

8. An apparatus according to claim 1, wherein one or a plurality of data regarding designation of a number of print copies, a paper orientation, a paper size, a paper feeding place, a paper ejecting place, a resolution, an enlargement/reduction (zoom), a page layout, watermarked characters, 2-side printing, a Z-folding process, a booklet process, a staple position, and a hole punch are included as the control data.

9. An apparatus according to claim 1, wherein the network is a LAN (Local Area Network).

10. An image forming method of executing an image forming process by issuing a print request to an image forming apparatus from a client apparatus via a network, comprising:

an identifying step of identifying a text portion and an attached file with respect to an E-mail transmitted from the client apparatus;

a recognizing step of recognizing control data which can be included in the text portion of the E-mail and control data which can be included in the attached file identified in said identifying step, both sets of control data being related to a print setting;

a discrimination step of discriminating whether or not the control data is included in both the text portion and in the attached file identified in said identifying step based on a recognition in said recognizing step;

a selecting step of selecting one set of control data, either the control data included in the text portion or the control data included in the attached file, in order to avoid conflict between a setting provided in the control data included in the text portion and a setting provided in the control data included in the attached file, when said discrimination means discriminates that the control data is included in both the text portion and in the attached file; and a control step of controlling a printing process using the one set of control data selected in said selecting step when in said discrimination step it is discriminated that the control data is included in both the text portion and in the attached file.

11. A method according to claim 10, wherein the client apparatus and the image forming apparatus are connected to different networks separated by a router.

12. A method according to claim 11, wherein in said recognizing step, it is recognized whether data included in the attached file is data including no control data or data including the control data.

13. A method according to claim 12, wherein if it is recognized in said recognizing step that the data enclosed in the attached file is data including no control data, the printing process of the data which does not include the control data is controlled in said control step on the basis of the control data included in the text portion of the E-mail.

14. A method according to claim 12, wherein if it is recognized in said recognizing step that the data included in the attached file is the data including the control data, the printing process of the data including the control data is controlled in said control step on the basis of the control data included in the data that is included in the attached file.

15. A method according to claim 11, wherein in the text portion or in the attached file identified in said identifying step, if it is recognized in said recognizing step that both the text portion and the attached file include the control data, the printing process of the attached file identified in said identifying step is controlled in said control step on the basis of the control data included in the text portion.

16. A method according to claim 11, wherein a control item which is not included in the control data is controlled in said control step by using an initial value which has been predetermined by the image forming apparatus.

17. A method according to claim 11, wherein one or a plurality of data regarding designation of a number of print copies, a paper orientation, a paper size, a paper feeding place, a paper ejecting place, a resolution, an enlargement/reduction (zoom), a page layout, watermarked characters, 2-side printing, a Z-folding process, a booklet process, a staple position, and a hole punch are included as the control data.

18. A method according to claim 9, wherein the network is a LAN (Local Area Network).

19. A computer-readable medium encoded with a computer program, the computer program, executed by a CPU installed in an image forming apparatus for printing data whose printing has been requested from a client apparatus via a network, comprising the steps of:

identifying a text portion and an attached file with respect to an E-mail transmitted from the client apparatus;

recognizing control data which can be included in the text portion of the E-mail and control data which can be included in the attached file identified in said identifying step, both sets of control data being related to a print setting;

discriminating whether or not the control data is included in both the text portion and in the attached file identified in said identifying step based on a recognition in said recognizing step;

a selecting step of selecting one set of control data, either the control data included in the text portion or the control data included in the attached file, in order to avoid conflict between a setting provided in the control data included in the text portion and a setting provided in the control data included in the attached file, when said discrimination means discriminates that the control data is included in both the text portion and in the attached file; and controlling a printing process using the one set of control data selected in said selecting step when in said discrimination step it is discriminated that the control data is included in both the text portion and in the attached file.

20. An image forming system for executing an image forming process by issuing a print request to an image forming apparatus from a client apparatus via a network, wherein said image forming apparatus comprises:

identifying means for identifying a text portion and an attached file with respect to an E-mail transmitted from the client apparatus;

recognizing means for recognizing control data which can be included in the text portion of the E-mail and control data which can be included in the attached file identified by said identifying means, both sets of control data being related to a print setting;

discrimination means for discriminating whether or not the control data is included in both the text portion and in the attached file identified by said identifying means based on a recognition by said recognizing means;

selecting means for selecting one set of control data, either the control data included in the text portion or the control data included in the attached file, in order to avoid conflict between a setting provided in the control data included in the text portion and a setting provided in the control data included in the attached file, when said discrimination means discriminates that the control data is included in both the text portion and in the attached file; and control means for controlling a printing process using the one set of control data selected by said selecting means when said discrimination means discriminates that the control data is included in both the text portion and in the attached file.

* * * * *